(12) United States Patent
Ozaki

(10) Patent No.: US 8,520,124 B2
(45) Date of Patent: Aug. 27, 2013

(54) IMAGE PICKUP LENS, IMAGE PICKUP APPARATUS, AND MOBILE TERMINAL

(75) Inventor: Yuichi Ozaki, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 17 days.

(21) Appl. No.: 13/390,280

(22) PCT Filed: Aug. 18, 2009

(86) PCT No.: PCT/JP2009/064435
§ 371 (c)(1),
(2), (4) Date: Feb. 13, 2012

(87) PCT Pub. No.: WO2011/021271
PCT Pub. Date: Feb. 24, 2011

(65) Prior Publication Data
US 2012/0140104 A1    Jun. 7, 2012

(51) Int. Cl.
*G02B 13/16* (2006.01)
*G02B 9/60* (2006.01)
*G02B 15/14* (2006.01)
*H04N 5/225* (2006.01)
*H04N 5/262* (2006.01)

(52) U.S. Cl.
USPC ........ 348/335; 348/360; 348/361; 348/240.3; 348/241; 359/676; 359/685; 359/763; 359/764; 359/714; 396/111

(58) Field of Classification Search
USPC ...... 348/335, 360, 361, 240.3, 241; 359/763, 359/764, 676, 685, 714; 396/111
See application file for complete search history.

(56) References Cited

U.S. PATENT DOCUMENTS

| | | | | |
|---|---|---|---|---|
| 8,179,615 B1 * | 5/2012 | Tang et al. | ..... | 359/714 |
| 8,305,697 B1 * | 11/2012 | Chen et al. | ..... | 359/714 |
| 8,395,851 B2 * | 3/2013 | Tang et al. | ..... | 359/714 |
| 8,395,852 B2 * | 3/2013 | Tsai et al. | ..... | 359/714 |
| 2012/0229920 A1 * | 9/2012 | Otsu et al. | ..... | 359/764 |
| 2013/0088788 A1 * | 4/2013 | You | ..... | 359/714 |

FOREIGN PATENT DOCUMENTS

| | | |
|---|---|---|
| JP | 6-281860 | 10/1994 |
| JP | 10-123418 | 5/1998 |
| JP | 2007-264180 | 10/2007 |
| JP | 2007-279282 | 10/2007 |
| JP | 2008-46526 | 2/2008 |

* cited by examiner

*Primary Examiner* — Roberto Velez
*Assistant Examiner* — Padma Haliyur
(74) *Attorney, Agent, or Firm* — Cozen O'Connor

(57) ABSTRACT

The image pickup lens is composed of, in order from the object side, an aperture stop; a first lens with positive refractive power, including a convex surface facing the object side; a second lens with negative refractive power, including a concave surface facing an image side; a third lens with positive refractive power, including a convex surface facing the image side; a fourth lens with positive refractive power, having a meniscus shape including a convex surface facing the image side; and a fifth lens with negative refractive power, including a concave surface facing the image side. The image pickup lens satisfies conditional expressions relating to curvature radiuses of the object-side surface and the image-side surface of the fourth lens, a distance on an optical axis from the aperture stop to a focal point at the image side, and a focal length of the total system of the image pickup lens.

12 Claims, 20 Drawing Sheets

FIG. 4
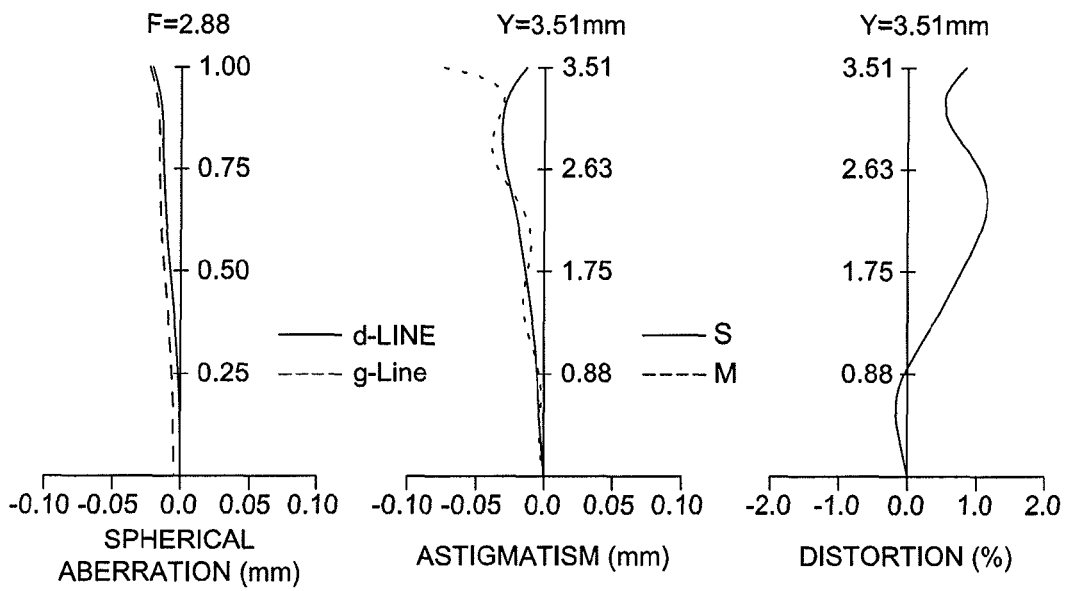
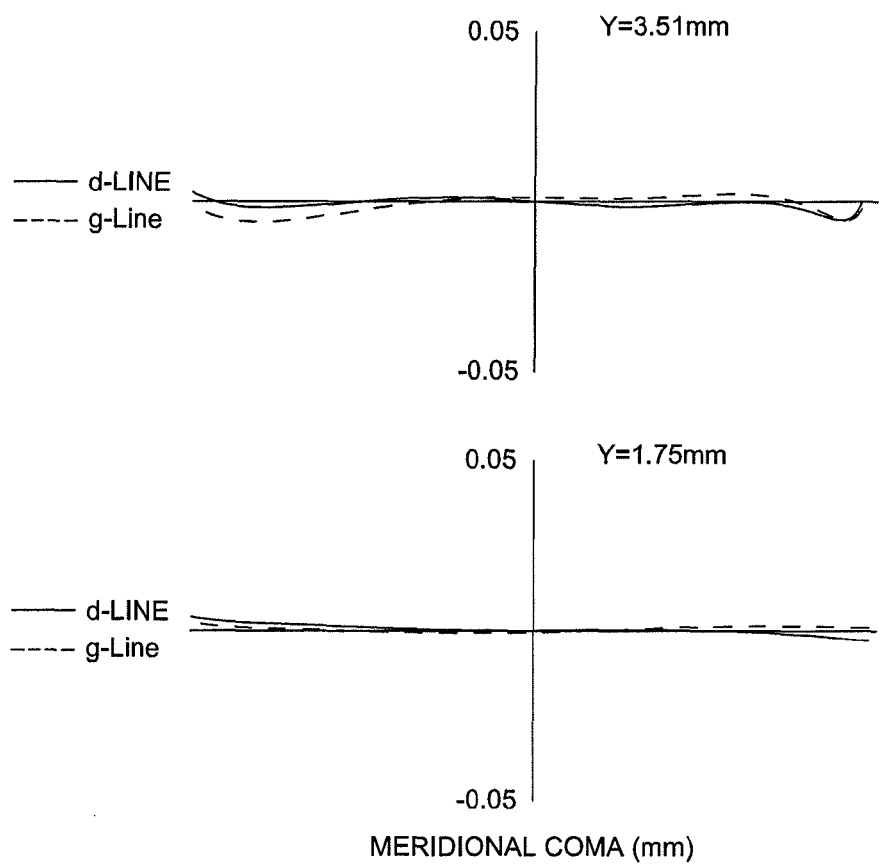

FIG. 6
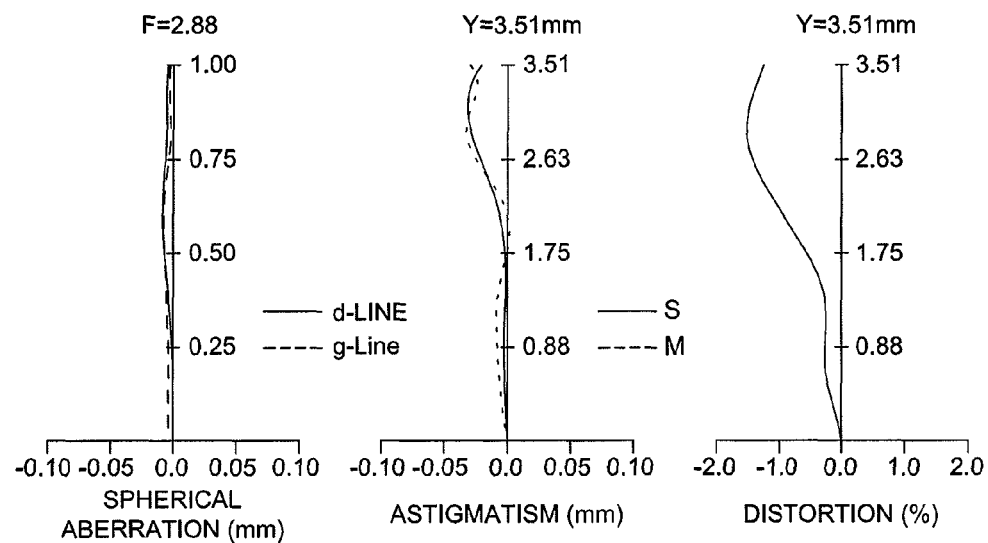
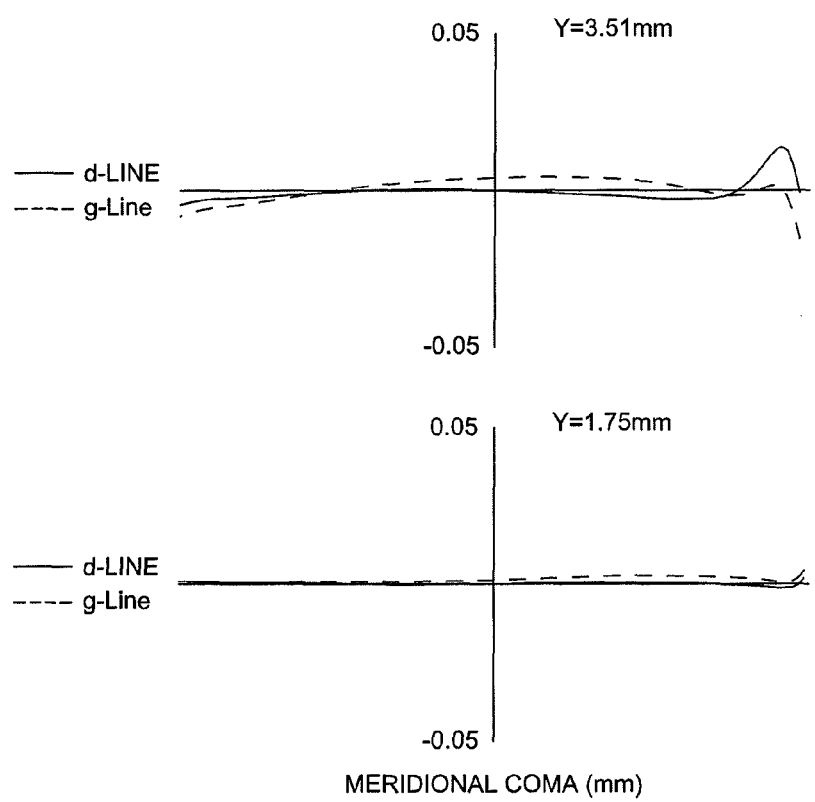

FIG. 8
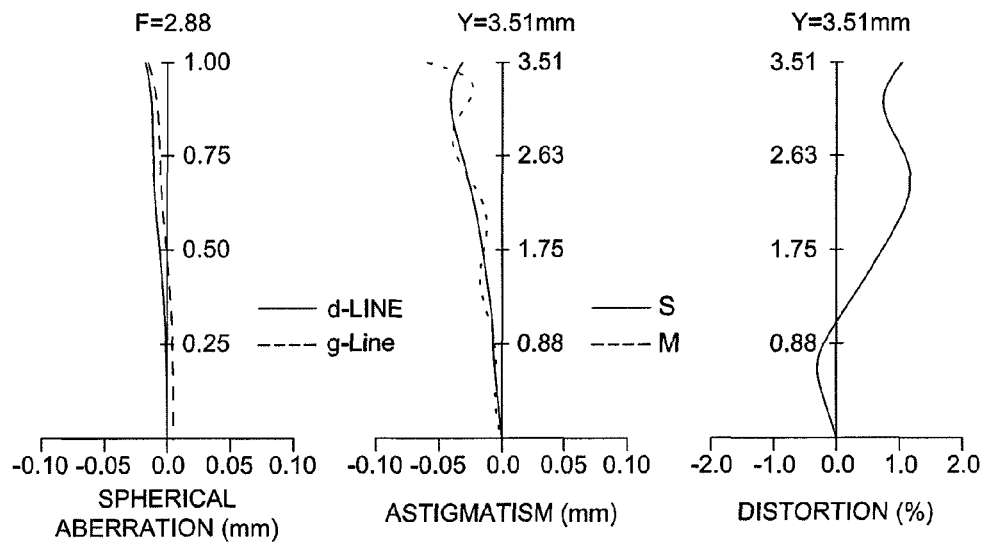
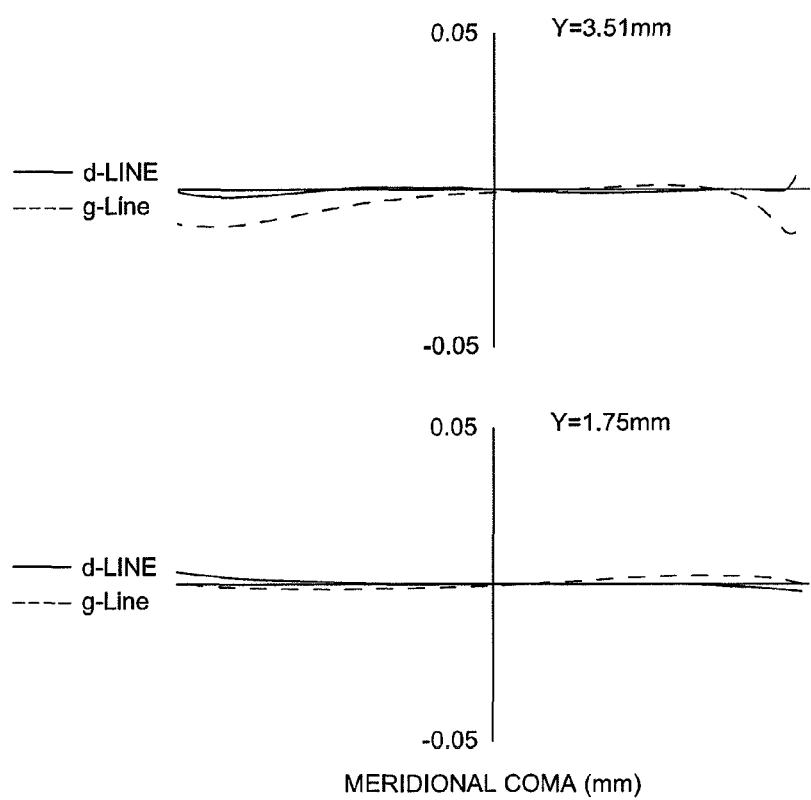
MERIDIONAL COMA (mm)

FIG. 10
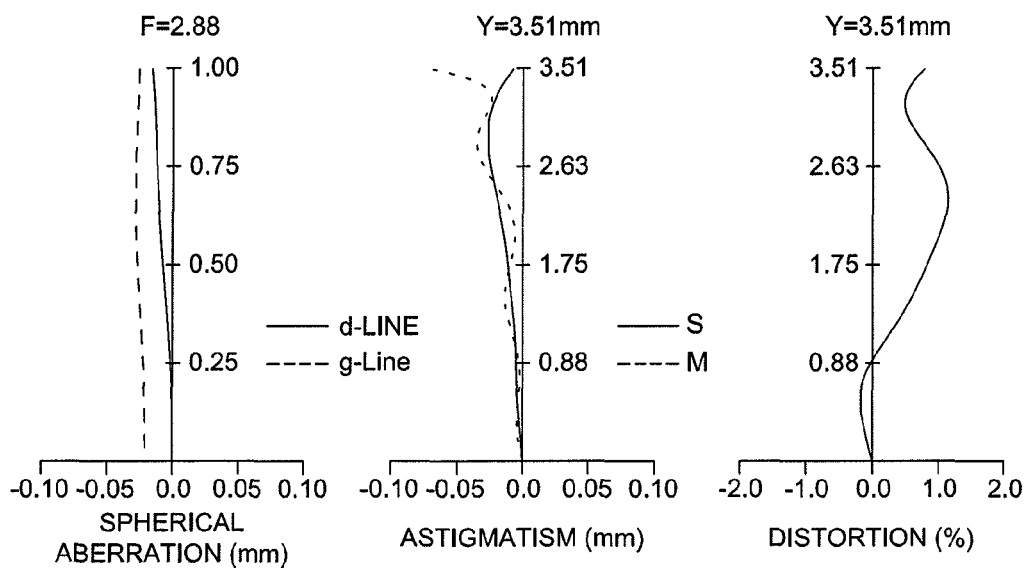
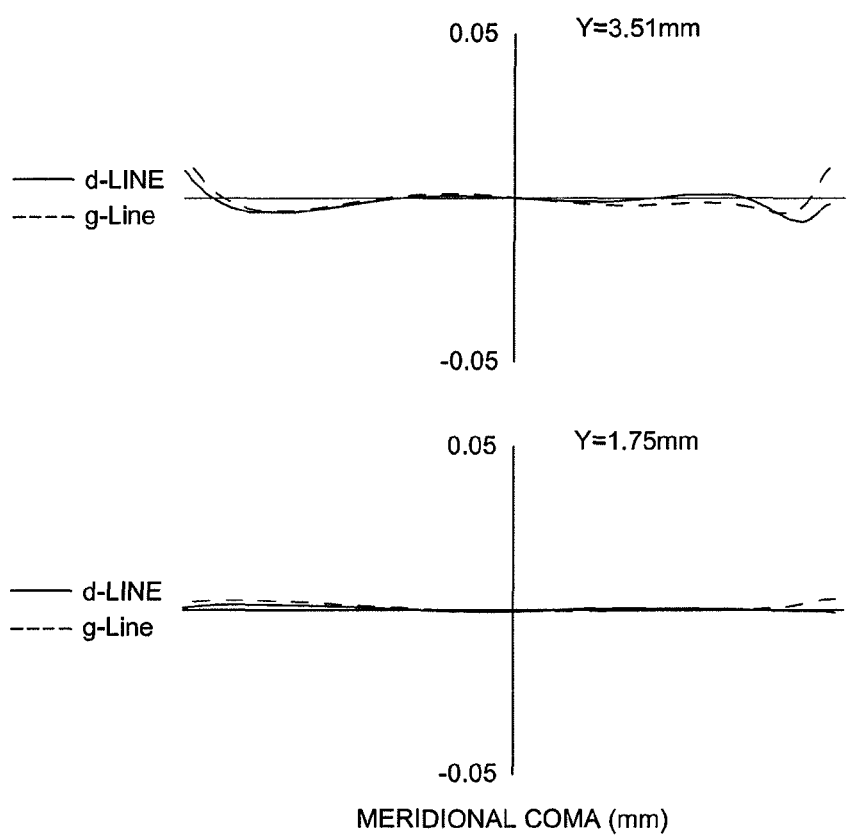

FIG. 12
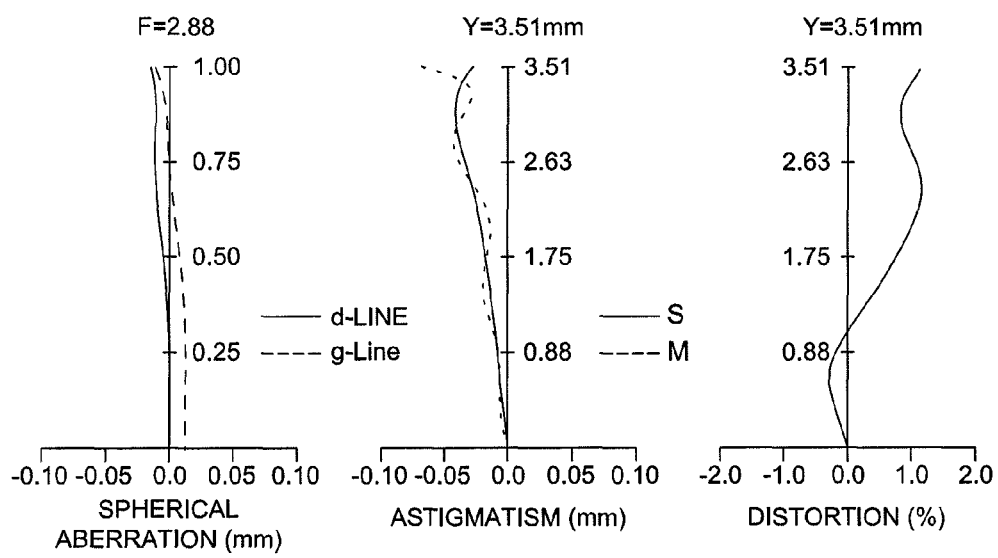
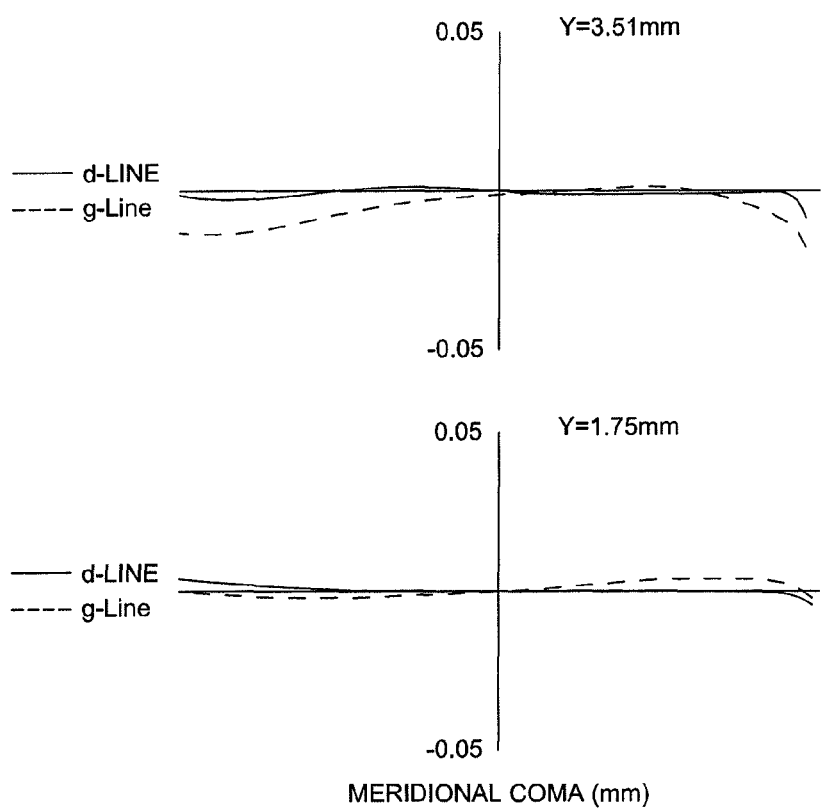
MERIDIONAL COMA (mm)

FIG. 14
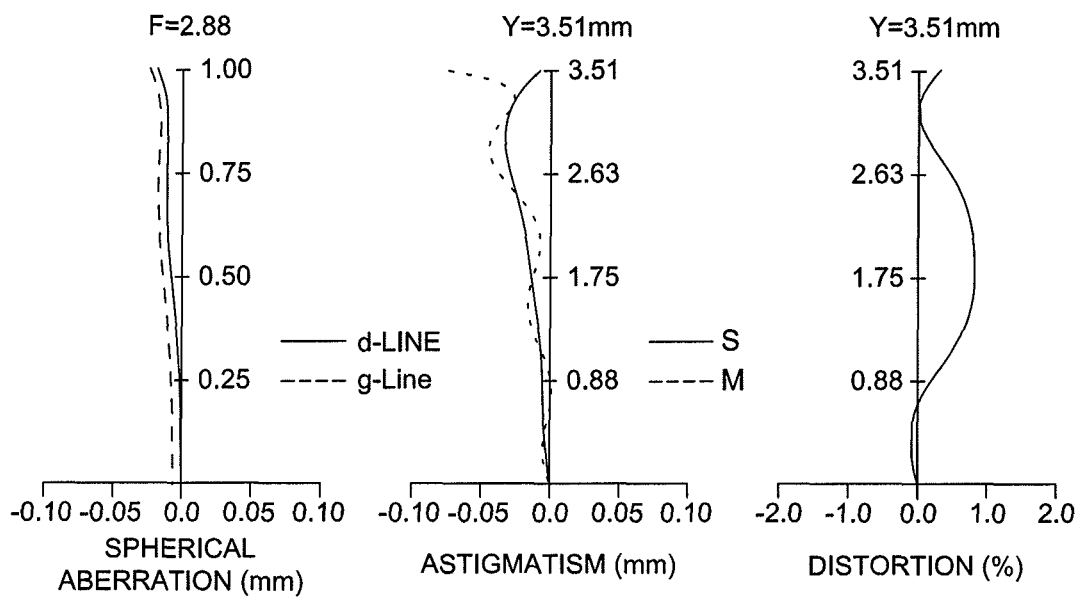
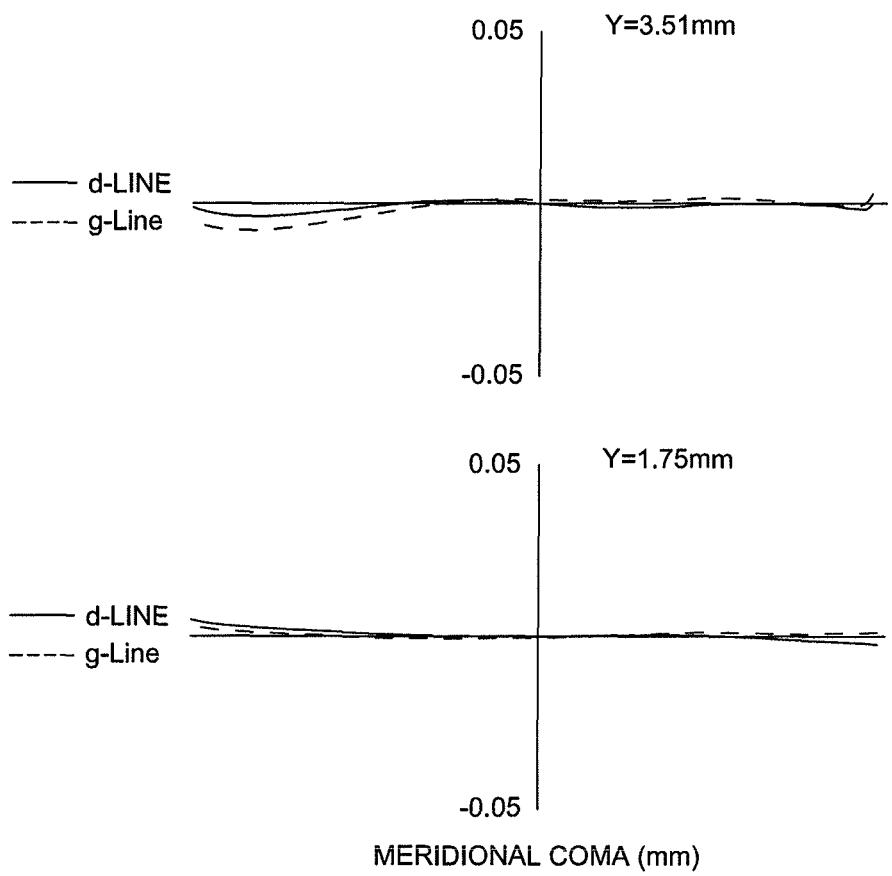

FIG. 16
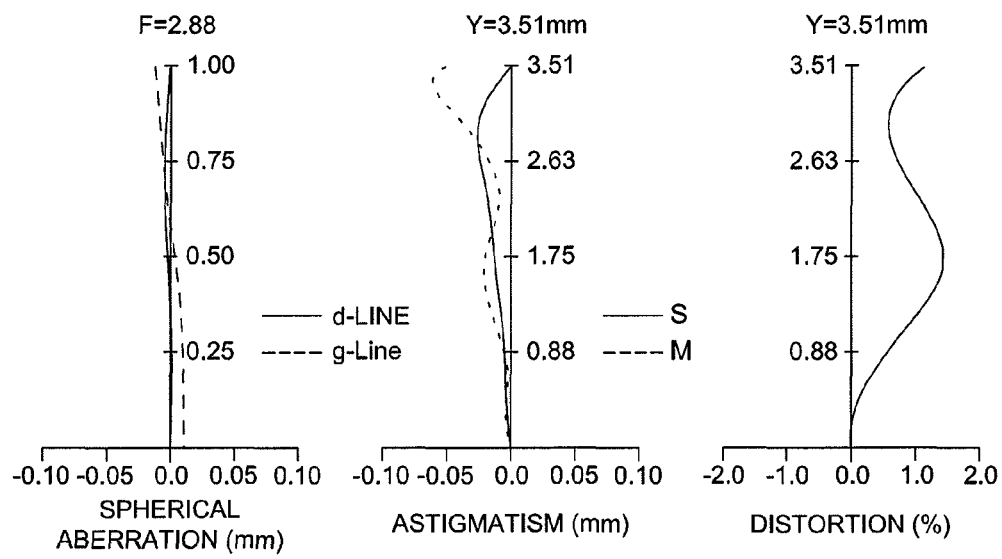
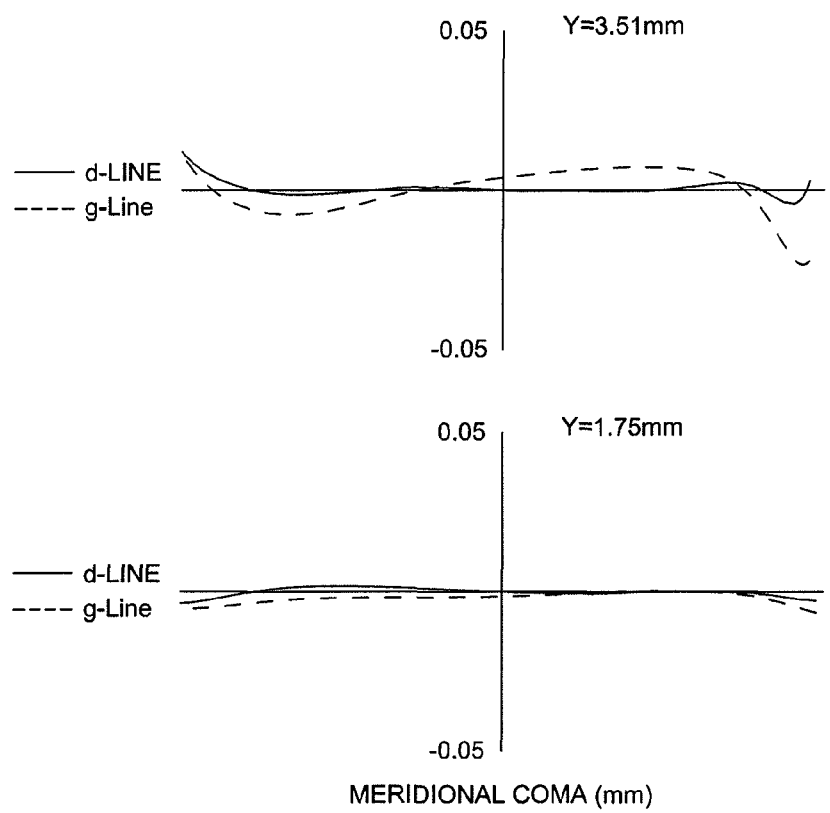

FIG. 18
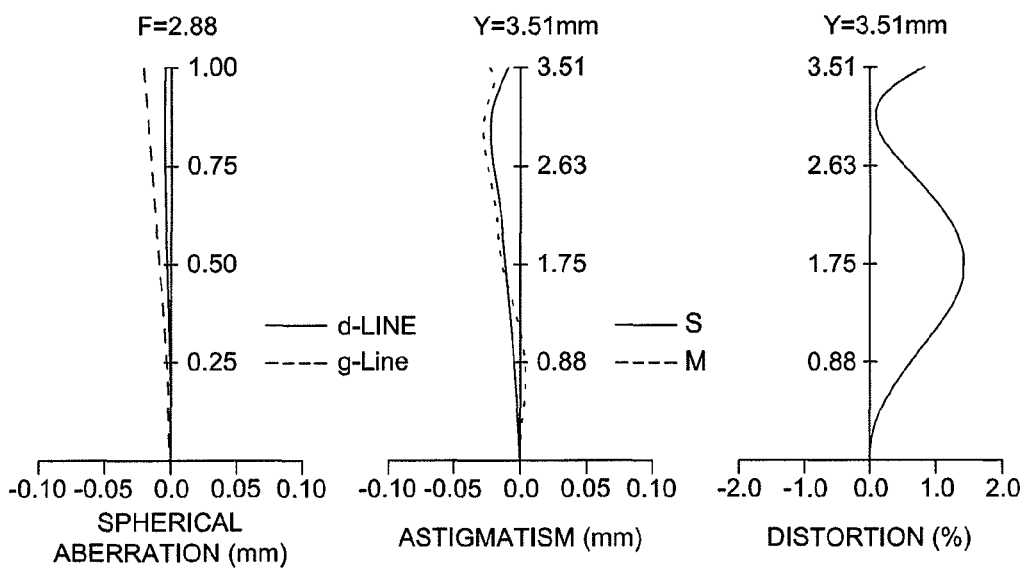
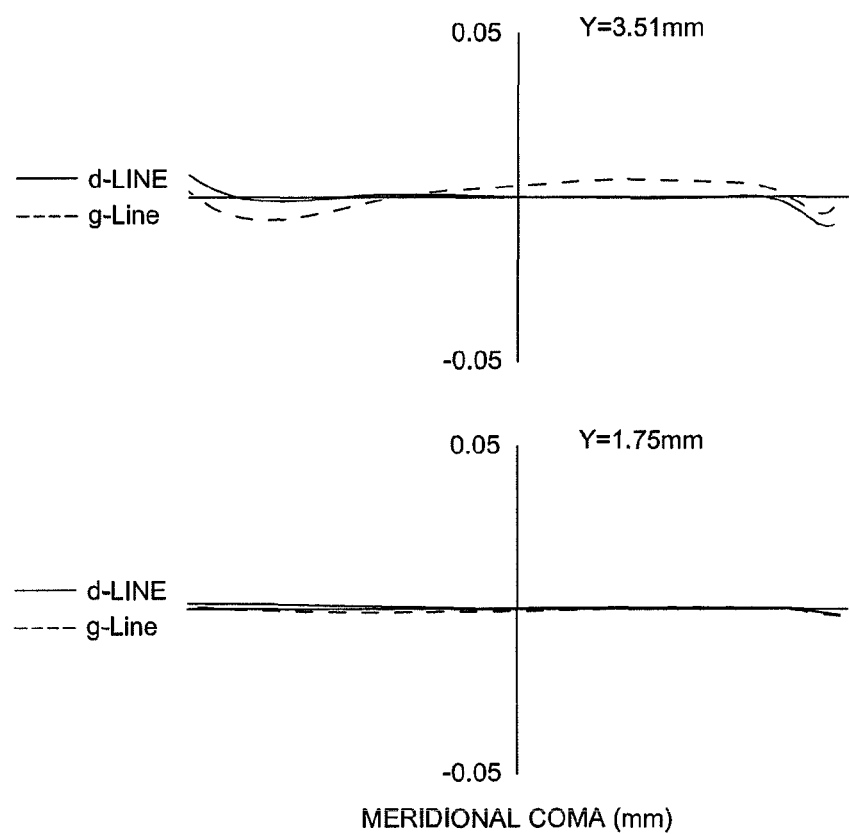

FIG. 20
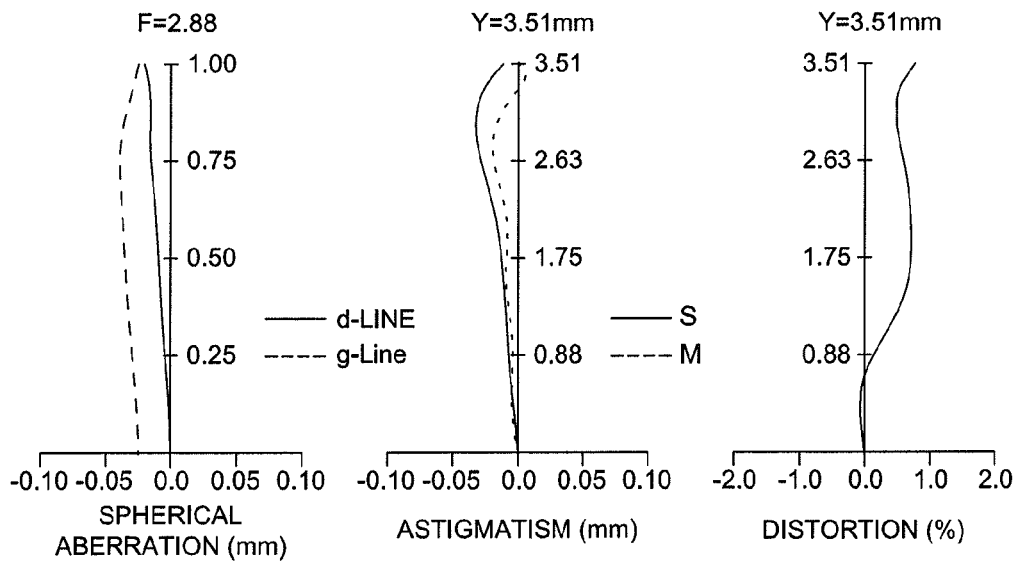
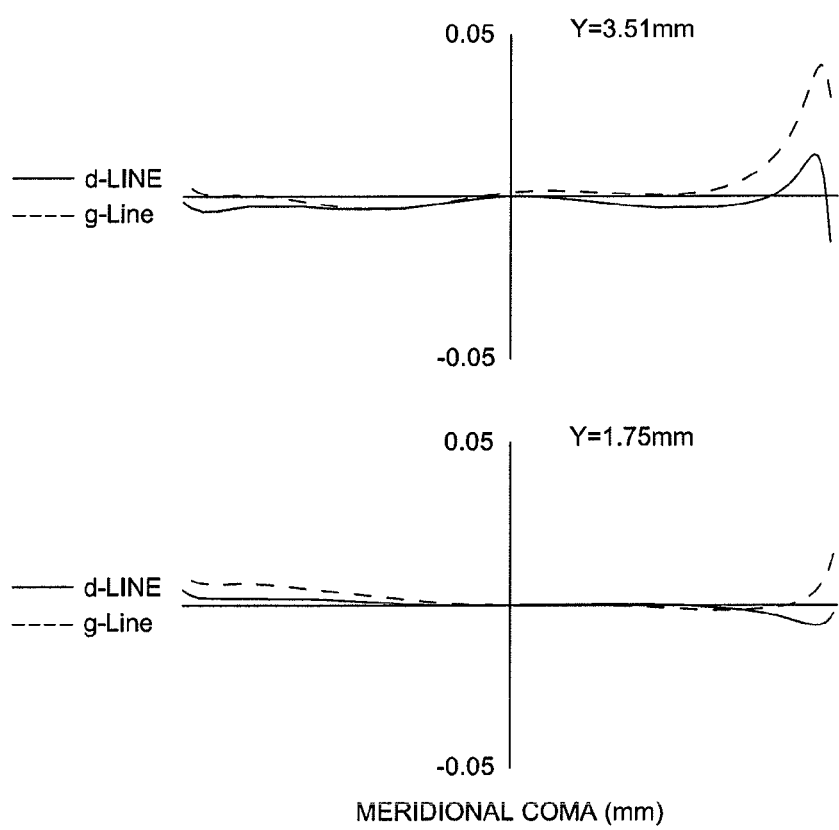

IMAGE PICKUP LENS, IMAGE PICKUP APPARATUS, AND MOBILE TERMINAL

RELATED APPLICATIONS

This application is a U.S. National Phase Application under 35 USC 371 of International Application PCT/JP2009/064435 filed Aug. 18, 2009.

TECHNICAL HELD

The present invention relates to an image pickup lens, an image pickup apparatus and a mobile terminal, which are small-sized and used with a solid-state image pickup element such as an imaging sensor of CCD type and an image sensor of CMOS type.

BACKGROUND ART

In recent years, with enhancement of properties and downsizing of image pickup apparatuses employing a solid-state image pickup element such as an imaging sensor of CCD (Charge Coupled Devices) type and an imaging sensor of CMOS (Complementary Metal-Oxide Semiconductor) type, cell phones and personal digital assistants equipped with such the image pickup apparatuses are coming into wide use. Further, as for image pickup lenses built in the image pickup apparatuses, enhancement of properties corresponding to increasing the number of pixels of an image pickup element is requested, while demands for furthermore downsizing is increasing.

As an image pickup lens for such the use, there is provided an image pickup lens with five-element structure, because its properties can be furthermore enhanced in comparison with a lens with a three-element or four-element structure.

As an image pickup lens with the five-element structure, an image pickup lens composed of in order from the object side, first lens with positive refractive index, second lens with negative refractive index, third lens with positive refractive power, fourth lens with negative refractive power, and fifth lens with negative refractive power is disclosed (For example, in Patent Literature 1).

Further, an image pickup lens composed of, in order from the object side, first lens with negative refractive index, second lens with positive refractive index, third lens with negative refractive power, fourth lens with positive refractive power, and fifth lens with negative refractive power is disclosed (For example, in Patent Literature 2).

CITATION LIST

Patent Literature

Patent Literature 1: JP-A No. 2007-264180
Patent Literature 2: JP-A No. 2007-279282

SUMMARY OF INVENTION

Technical Problem

Generally, an image pickup lens with a five-element structure is difficult to be downsized because the number of lenses is greater than a lens with a three-element or four-element structure. However, in the image pickup lens disclosed in Patent Literature 1, the most part of refractive power of the total lens system is assigned to the first to three lenses, and the fourth lens and fifth lens have just effects as lenses having weak refractive power for correcting the image plane. Therefore, its aberration correction is insufficient and a deterioration of its properties makes handling an increased number of pixels of an image pickup element difficult under the condition that the total length of the lens is shortened, which is a problem.

In the image pickup lens described in Patent Literature 2, the front lens group composed of the first lens and the second lens is structured as a spherical lens system. Therefore, spherical aberration and coma are insufficiently corrected and excellent properties are hardly maintained. Further, the image pickup lens has a structure that each of the front lens group and the rear lens group which is composed of the third lens and the succeeding lenses has positive refractive power. In the structure, a position of a principal point of the optical system is located closer to the image side and the back focal length is elongated, in comparison with a telephoto type structure wherein the rear lens group has negative refractive power. Therefore, the image pickup lens is disadvantageous in downsizing.

The present invention has been achieved in view of the above problems, and is aimed to provide a five-element-structure image pickup lens which achieves both of furthermore downsizing in comparison with conventional lenses and excellent correction of various aberrations, an image pickup apparatus equipped with the image pickup lens, and a mobile terminal equipped with the image pickup apparatus.

As for a barometer of downsizing an image pickup lens, the present invention is aimed to achieve a downsizing at a level satisfying the following expression. When the range is satisfied, reducing in size and weight of the whole image pickup apparatus can be achieved.

$$L/2Y<1.00 \tag{8}$$

In the expression,

L is a distance on the optical axis from the lens surface closest to the object side in the total system of the image pickup lens to the focal point at the image side, and 2Y is a diagonal length of an image pickup plane of a solid-state image pickup element (a diagonal length of an effective rectangular pixel area of the solid-state image pickup element).

Herein, the focal point at the image side means an image point formed when a parallel ray which is parallel with the optical axis enters the image pickup lens.

When there is arranged a parallel flat plate such as an optical low-pass filter, an infrared cut-off filter, a sealing glass of a package of a solid-state image pickup element between the surface closest to the image of the image pickup lens to the focal point at the image side, the value of L is calculated under the assumption that the area of the parallel flat plate is given as an air-equivalent distance. The following expression is more preferable.

$$L/2Y<0.90$$

Solution to Problem

The above object is achieved by the invention described below.

1. An image pickup lens for forming an image of a subject onto a photoelectric conversion section of a solid-state image pickup element, the image pickup lens characterized by comprising, in order from an object side: an aperture stop; a first lens with positive refractive power, comprising a convex surface facing the object side; a second lens with negative refractive power, comprising a concave surface facing an image side; a third lens with positive refractive power, comprising a convex surface facing the image side; a fourth lens with positive refractive power, having a meniscus shape comprising a convex surface facing the image side; and a fifth lens with negative refractive power, comprising a concave surface facing the image side, wherein the image pickup lens satisfies the following conditional expressions.

$$2.0 < (r7+r8)/(r7-r8) < 8.0 \quad (1)$$

$$0.8 < SL/f < 1.5 \quad (2)$$

In the expressions, r7 is a curvature radius of a surface facing the object side of the fourth lens, r8 is a curvature radius of the surface facing the image side of the fourth lens, SL is a distance on an optical axis from the aperture stop to a focal point at the image side, and f is a focal length of a total system of the image pickup lens.

A basic structure of the present invention for obtaining an image pickup lens achieving downsizing and excellently corrected aberrations is composed of an aperture stop; a first lens with positive refractive power, comprising a convex surface facing the object side; a second lens with negative refractive power, comprising a concave surface facing an image side; a third lens with positive refractive power, comprising a convex surface facing the image side; a fourth lens with positive refractive power, having a meniscus shape comprising a convex surface facing the image side; and a fifth lens with negative refractive power, comprising a concave surface facing the image side. This lens has a lens structure of a so-called telephoto type wherein there are arranged a positive lens group composed of a first lens, a second lens, a third lens and a fourth lens in order form the object side, and further arranged a negative fifth lens, which is advantageous to shorten the total length of the image pickup lens. Further, by using two negative lenses in the five-element structure, the number of lenses having a light-diverging effect can be increased to correct Petzval sum easily, and an image pickup lens in which an excellent image-forming performance is maintained up to the periphery of an image area can be obtained.

The conditional expression (1) provides a shaping factor of the fourth lens. This lens structure has a tendency to strengthen the refractive power of positive lenses such as the first lens and the third lens and to shorten the focal length of the total system, in order to move the position of the principal point toward the object side with a reduction of the total length. To solve that, when the value exceeds the lower limit of the conditional expression (1), the fourth lens is formed in a strong meniscus shape, which reduces a difference in incident angle between the upper marginal ray and the lower marginal ray of a ray passing an off-axis area and allows correcting coma effectively. Further, when the value exceeds the lower limit of the conditional expression (1), the position of the principal ray of the fourth lens with positive refractive power is moved toward the image side, and the focal length of the total system can be enlarged. On the other hand, when the value becomes lower than the upper limit of the conditional expression (1), generation of higher order aberrations such as field curvature coming from increasing of the curvature radius of the image-side surface can be reduced.

The conditional expression (2) provides the ratio of a distance on the optical axis from the aperture stop to the focal point at the image side. Herein, the focal point at the image side means an image point formed when a parallel ray which is parallel with the optical axis enters the image pickup lens. When there is arranged a parallel flat plate such as an optical low-pass filter, an infrared cut-off filter, a sealing glass of a package of a solid-state image pickup element between the surface closest to the image in the image pickup lens and the focal point at the image side, the value of SL is calculated under the assumption that the area of the parallel flat plate is given as an air-equivalent distance. When the aperture stop is arranged closest to the object and the value exceeds the lower limit of the conditional expression (2), the position of the exit pupil can be located at a farther position from the image pickup plane even in an image pickup lens with the shortened total length, which can reduce the incident angle of the principal ray (an angle formed between the principal ray and the optical axis) of a light flux to be formed into an image around the periphery of the image pickup plane of the solid-state image pickup element. Thereby, so-called telecentricity can be maintained. On the other hand, when the value becomes below the upper limit of the conditional expression (2), an increase of the total length can be prevented. Further, in a condition that a mechanical shutter is required, the shutter can be arranged at the closest position to the object and an image pickup lens with the shortened total length can be obtained.

2. An image pickup lens described in Item 1, characterized by satisfying the following conditional expression.

$$0.6 < f4/f < 2.0 \quad (3)$$

In the expression, f4 is a focal length of the fourth lens, and f is a focal length of a total system of the image pickup lens.

The conditional expression (3) provides the ratio of the focal length of the fourth lens and a focal length of the total system. With a reduction of the total length, the back focal length becomes short similarly to the focal length of the total system, which sometimes causes difficulty in securing a space where a parallel flat plate such as an optical low-pass filter, an infrared cut-off filter, a sealing glass of a package of a solid-state image pickup element is disposed, between the surface closest to the image of the image pickup lens and the focal point at the image side. The back focal length can be secured also by satisfying the range of the conditional expression (1), but the focal length of the total system sometimes becomes excessively long. When the image pickup lens satisfies the range of the conditional expression (1) and the value becomes lower than the upper limit of the conditional expression (3), the refractive power of the fourth lens becomes strong, which enables to secure the back focal length and to secure the focal length of the total system. On the other hand, when the value exceeds the lower limit of the conditional expression (3), the positive refractive power of the fourth lens can be maintained properly, which enables to reduce the total length of the lens and reduce the off-axis aberrations such as field curvature and distortion in a excellent condition.

3. The image pickup lens described in Item 1 or 2, characterized by satisfying the following conditional expression.

$$0.5 < f3/f4 < 5.0 \quad (4)$$

In the expression, f3 is a focal length of the third lens, and f4 is a focal length of the fourth lens.

The conditional expression (4) provides the ratio of the focal lengths of the third lens and the fourth lens. When the value becomes below the conditional expression (4), the refractive power of the third lens can be maintained properly, the composite principal point of the first to fourth lenses can be located at a closer position to the object, and the total length of the image pickup lens can be reduced. On the other hand, when the value exceeds the lower limit of the conditional expression, the refractive power of the third lens can be shared with the fourth lens arranged at the image side thereof whereby, the focal length of the total system can be secured.

4. The image pickup lens described in any one of Items 1 to 3, characterized by satisfying the following conditional expression.

$$20 < v1-v2 < 70 \quad (5)$$

In the expression, v1 is an Abbe number of the first lens, and v2 is an Abbe number of the second lens.

The conditional expression (5) provides a conditional expression for correcting chromatic aberrations of the total system of the image pickup lens in an excellent condition. When the value exceeds the lower limit of the conditional expression (5), chromatic aberrations such as longitudinal chromatic aberration and magnification chromatic aberration can be corrected in a balanced manner. On the other hand, when a value becomes lower than the upper limit of the conditional expression, the lenses can be formed of materials which can be easily obtained.

Further, the following conditional expression is preferably satisfied.

$$25 < v1-v2 < 65$$

5. The image pickup lens described in any one of Items 1 to 4, characterized by satisfying the following conditional expression.

$$1.55 < n2 < 2.10 \quad (6)$$

In the expression, n2 is a refractive index of the second lens for d-line.

The conditional expression (6) is a conditional expression for excellently correcting chromatic aberrations and field curvature of the total system of the image pickup lens. When the value exceeds the lower limit of the conditional expression (6), the refractive power of the second lens which has relatively large dispersion can be maintained properly and chromatic aberrations and field curvature can be corrected excellently. On the other hand, when the value becomes lower than the upper limit of the conditional expression, the lenses can be formed of materials which can be easily obtained.

Further, the following conditional expression is preferable satisfied.

$$1.60 < n2 < 2.00$$

6. The image pickup lens described in any one of Items 1 to 5, characterized in that a focal position is adjusted by moving the first through third lenses, and the image pickup lens satisfies the following conditional expression.

$$0.05 < d6/f < 0.15 \quad (7)$$

In the expression, d6 is an air distance between the third lens and the fourth lens, and f is a focal length of a total system of the image pickup lens.

When the focal position is adjusted in an auto-focusing function and a function switching to macro-photography, though a total movement that the whole lens group moves in the optical axis direction is generally performed, a partial movement that a part of the lens group such as the first to third lenses moves in the optical axis to adjust the focal position can be performed. When the partial movement is employed, some optical systems can reduce the deterioration of the performance caused when the focal point is adjusted to a subject at a close distance, and a movable lens group can be constructed by a part of the lens group, rather than the whole lens group. Therefore, a drive mechanism can be simplified and reduction in size and weight of the whole image pickup apparatus can be achieved, which is advantageous.

Further, when the partial movement is performed, the air distance on the optical axis between the third lens and the fourth lens is preferably set to satisfy the conditional expression (7).

When the value exceeds the lower limit of the conditional expression (7), a stroke of the partial movement of the first to third lenses can be sufficiently secured. Further, the positive refractive power at the periphery of the fourth lens can be properly maintained, magnification chromatic aberration can be corrected in an excellent condition and the telecentricity at the periphery can be secured easily. On the other hand, when the value becomes lower than the upper limit of the conditional expression, the air distance on the optical axis between the third lens and the fourth lens does not become excessively large and the total length of the image pickup lens can be reduced.

7. The image pickup lens described in any one of Items 1 to 6, characterized in that the surface facing the image side of the second lens has an aspheric shape wherein negative refractive power becomes weaker at a position farther from the optical axis.

The aspheric shape wherein negative refractive power at a position becomes weaker as the position moves from an optical axis to the periphery, prevents a my from being deflected excessively at the periphery, which corrects off-axis aberrations in an excellent condition and secures an excellent telecentricity at the periphery.

8. The image pickup lens described in any one of Items 1 to 7, characterized in that the aperture stop is located at a position closer to the image side than a position on an optical axis on the surface facing the object side of the first lens, and is arranged to be closer to the object side than a most peripheral portion of the surface facing the object side of the first lens.

By arranging the aperture stop at a position closer to the image side than a position on an optical axis on the object-side surface of the first lens, and closer to the object side than a most peripheral portion of the surface facing the object side of the first lens, the refraction angle at the object-side surface of the first lens can be reduced. Therefore, high order of spherical aberrations and coma generated in the first lens can be reduced. Further, since the height of rays passing the first lens can be lowered, the flange thickness of the first lens can be secured easily and the molding property can be enhanced.

9. The image pickup lens described in any one of Items 1 to 8, characterized in that the surface facing the image side of the fifth lens is formed into an aspheric shape and has negative refractive power at a center, where the negative refractive power becomes weaker at a position closer to a periphery, and the surface facing the image side of the fifth lens includes an inflection point.

By forming the image-side surface of the fifth lens into an aspheric shape such that negative refractive power becomes weaker as the position goes from the optical axis toward the periphery and the image-side surface includes an inflection point, the telecentricity of a light flux at the image side can be easily secured. Further, the image-side surface of the second lens is not required to have excessively weak negative refractive power, and off-axis aberrations can be corrected excellently. Herein, the "inflection point" means a point on an aspheric surface such that a tangential plane of the vertex of the aspheric surface becomes a plane perpendicular to the optical axis in the curve of the sectional shape of the lens within the effective radius.

10. The image pickup lens described in any one of Items 1 to 9, characterized in that each of the first to fifth lenses is formed of a plastic material.

In recent years, for the purpose of downsizing the whole image pickup apparatus, there has been developed a solid-state image pickup element with smaller pixel pitch in comparison with that having the same number of pixels. As a result, there has been developed a solid-state image pickup element with a small-sized image pickup surface has been developed. An image pickup lens for such the solid-state image pickup element with a small-sized image pickup plane is required to have a relatively short focal length of the total system, which reduces the curvature radiuses and outer diameters of the respective lenses significantly. Therefore, comparing with a glass lens produced by a polishing process which is a time-consuming process, when all the lenses are formed with plastic lenses produced by injection molding, the lenses can be mass-produced at low cost even under the condition that the lenses have small curvature radiuses and small outer diameters. Further, since a pressing temperature can be set to be low for a plastic lens, wear of a mold can be reduced. As the result, the replacing frequency and the maintenance frequency of the mold can be reduced and the cost can be saved.

11. An image pickup apparatus characterized by comprising:
    a solid-state image pickup element for performing a photoelectric conversion for an image of a subject; and the image pickup lens described in any one of Items 1 to 10.

By employing the image pickup lens of the present invention, an image pickup apparatus with a smaller-size and higher performances can be obtained.

12. A mobile terminal comprising the image pickup apparatus described in Item 11.

By employing the image pickup apparatus of the present invention, a mobile terminal with a smaller-size and higher performances can be obtained.

Advantageous Effects of Invention

The image pickup lens, image pickup apparatus and mobile terminal of the present invention can correct various aberrations excellently and obtain high optical performances, while achieving a smaller size in comparison with the conventional types.

BRIEF DESCRIPTION OF DRAWINGS

FIG. 4 shows aberration diagrams of the lens of Example 1.
FIG. 6 shows aberration diagrams of the lens of Example 2.
FIG. 8 shows aberration diagrams of the lens of Example 3.
FIG. 10 shows aberration diagrams of the lens of Example 4.
FIG. 12 shows aberration diagrams of the lens of Example 5.
FIG. 14 shows aberration diagrams of the lens of Example 6.
FIG. 16 shows aberration diagrams of the lens of Example 7.
FIG. 18 shows aberration diagrams of the lens of Example 8.
FIG. 20 shows aberration diagrams of the lens of Example 9.

DESCRIPTION OF EMBODIMENTS

Figure 1:
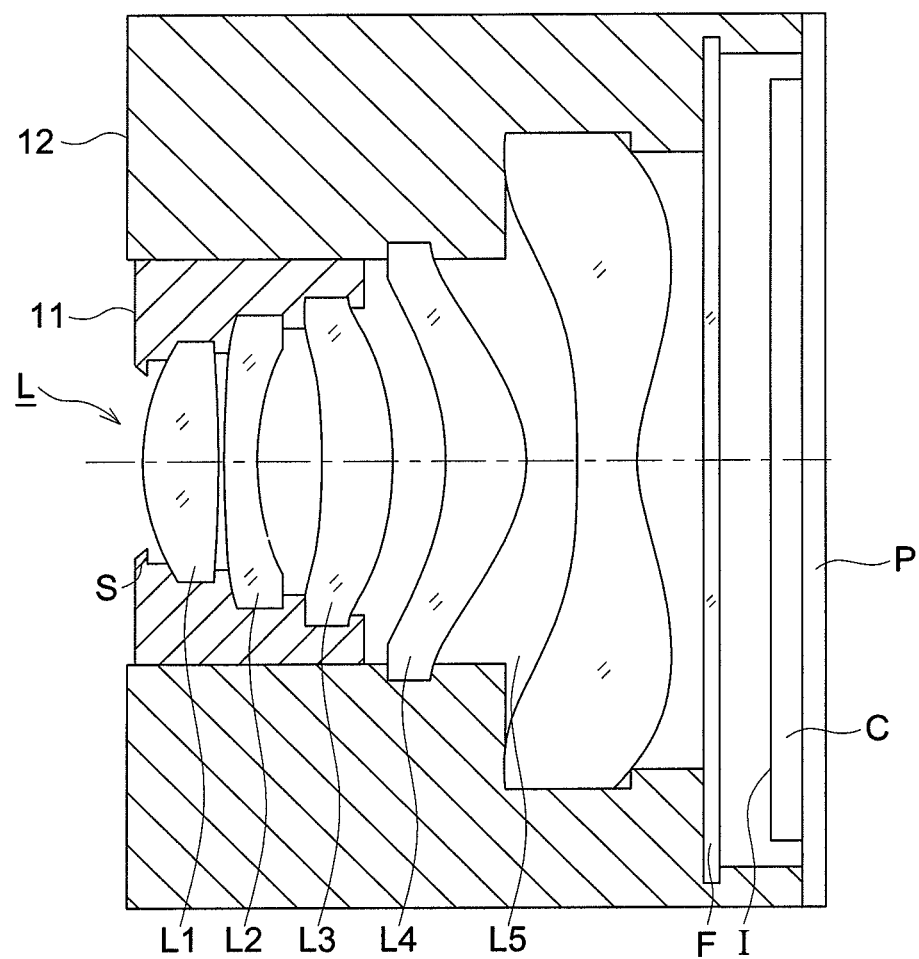
FIG. 1 shows a schematic sectional view of an image pickup apparatus.

First, an image pickup apparatus equipped with an image pickup lens of the present invention will be described based on the schematic sectional view shown in FIG. 1

Image pickup lens L is composed of, in order from the object side, first lens L1, second lens L2, third lens L3, fourth lens L4 and fifth lens L5. First lens L1, second lens L2, third lens L3 are held by lens frame 11. In lens frame 11, stop S is formed at the object side of first lens L1. On the other hand, fourth lens L4 and fifth lens L5 are held by lens frame 12. At the image side of fifth lens L5, parallel flat plate F such as an optical low-pass filter, IR cut-off filter and sealing glass of solid-state image pickup element I is held by lens frame 12. As for an image of the subject, a light flux is regulated by stop S, and passes image pickup lens L and parallel flat plate F. Then, an image is formed onto image pickup plane I of solid-state image pickup element C to be photo-electrically converted. Solid-state image pickup element C is installed on printed wiring board P. Printed wiring board P is fixed on lens frame 12. The image signal of the subject image which has been photo-electrically converted is transmitted to the outside through printed wiring board P.

Lens frame 11 holding first lens L1, second lens L2 and third lens L3 is moved in the optical axis direction with respect to lens frame 12 holding fourth lens L4 and fifth lens L5 to adjust the focal point in an auto-focusing function and a function switching to a macro-photography.

Next, an example of a cell phone as a mobile terminal equipped with the above image pickup apparatus will be described based on the external view shown in FIG. 2. FIG. 2A shows a view that a cell phone which has been folded is expanded and is observed from the inner side, and FIG. 2B shows a view that the cell phone which has been folded is expanded and is observed from the outer side.

Figure 2:
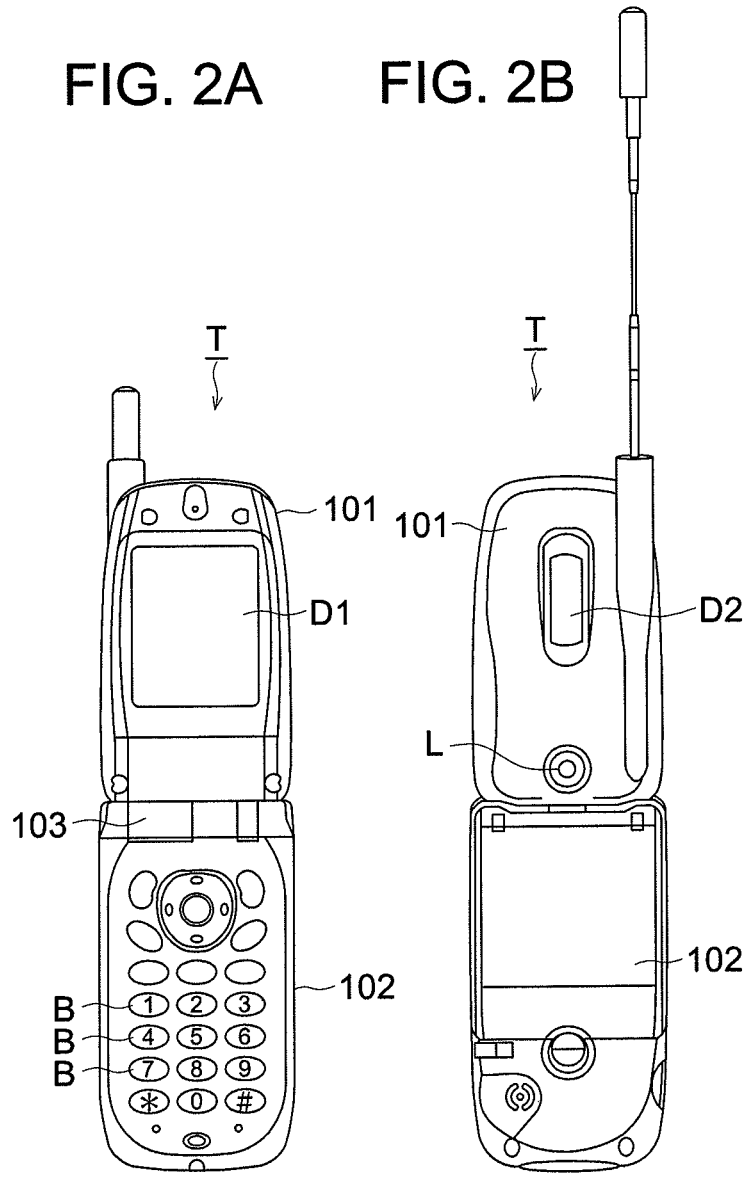
FIG. 2A and 2B shows an external view of a cell phone.

In FIG. 2, in cell phone T, upper case 101 as a case including displays D1 and D2 and lower case 102 including operation buttons are connected together with hinge 103. The image pickup apparatus is housed in the lower position of the display D2 in upper case 101, and image pickup lens L is exposed at the external surface of upper case 101.

Herein, the image pickup apparatus may be disposed at the upper side of display D2 or on the side surface, in upper case 101. Further, cell phone T is not limited to a folded style.

EXAMPLES

Hereinafter, examples of the image pickup lenses of the present invention will be shown.
Signs used in respective examples are as the followings.
f: Focal length of the total system of the image pickup lens
fB: Back focal length
F: F number
2Y: Diagonal length of an image pickup plane of the solid-state image pickup element
ENTP: Entrance pupil position (distance from the first surface to the entrance pupil position)
EXTP: Exit pupil position (distance from the image pickup plane to the exit pupil position)
H1: Position of the front principal point (distance from the first surface to the front principal point position)

H2: Position of the rear principal point (distance from the end surface to the rear principal point position)
R: Curvature radius
D: Surface distance on the optical axis
Nd: Refractive index of a lens material for d-line
vd: Abbe number of the lens material Further, in the surface data, the unit of R, D and effective radius is mm.

In the surface data, the surface represented by the surface number followed by an asterisk "*" is an aspheric surface, and its surface shape is defined by the following expression (Math. 1) where the origin is located at the surface vertex, the X-axis extends in the optical axis direction, and h represents the height from the optical axis in the perpendicular direction to the optical axis.

$$X = \frac{h^2/R}{1 + \sqrt{1 - (1+K)h^2/R^2}} + \sum A_i h^i \quad \text{[Math. 1]}$$

In the expression, Ai is i-th order aspheric coefficient, R is a curvature radius, and K is a conic constant. In the aspheric surface coefficients of each example, the power of 10 (for example $2.5 \times 10^{-2}$) is represented by using "E" (for example, 2.5E−02).

Example 1

The total specification of the image pickup lens will be shown below.
f=4.63 mm
fB=0.48 mm
F=2.88
2Y=7.016 mm
ENTP=0 mm
EXTP=−2.97 mm
H1=−1.59 mm
H2=−4.15 mm The surface data of the image pickup lens will be shown below.

| Surface number | R | D | Nd | vd | Effective radius |
|---|---|---|---|---|---|
| 1(Stop) | ∞ | −0.050 | | | 0.80 |
| 2(*) | 2.033 | 0.686 | 1.54470 | 56.2 | 0.88 |
| 3(*) | −12.786 | 0.050 | | | 0.96 |
| 4(*) | 8.852 | 0.300 | 1.63200 | 23.4 | 0.98 |
| 5(*) | 2.389 | 0.591 | | | 1.03 |
| 6(*) | −8.677 | 0.642 | 1.54470 | 56.2 | 1.20 |
| 7(*) | −3.322 | 0.483 | | | 1.42 |
| 8(*) | −2.286 | 0.738 | 1.54470 | 56.2 | 1.65 |
| 9(*) | −1.192 | 0.464 | | | 1.87 |
| 10(*) | −18.636 | 0.540 | 1.54470 | 56.2 | 2.41 |
| 11(*) | 1.450 | 0.600 | | | 2.97 |
| 12 | ∞ | 0.145 | 1.51630 | 64.1 | 3.28 |
| 13 | ∞ | | | | 3.32 |

The aspheric surface coefficients of the image pickup lens will be shown below.
Second Surface
K=0.12198E+00, 0.71072E−03, A6=−0.86790E−03, A8=−0.80391E−02, A10=0.97290E−03, A12=0.57532E−02, A14=−0.32178E−02
Third Surface
K=0.30000E+02, A4=0.74126E−02, A6=−0.13036E−01, A8=0.161402E−02, A10=0.18251E−02, A12=−0.36657E−02, A14=0.36286E−02
Fourth Surface
K=0.19169E+00, A4=−0.40663E−01, A6=−0.25243E−01, A8=−0.30394E−02, A10=0.38707E−02, A12=0.10939E−02, A14=−0.13121E−02
Fifth Surface
K=−0.59793E+01, A4=0.11737E−01, A6=0.26830E−01, A8=−0.45536E−02, A10=0.49326E−02, A12=0.30501E−03, A14=0.79395E−03
Sixth Surface
K=0.28708E+02, A4=−0.35476E−01, A6=−0.81047E−02, A8=−0.41706E−02, A10=0.13542E−02, A12=0.97322E−03, A14=0.10377E−02
Seventh Surface
K=0.15874E+01, A4=−0.18118E−01, A6=−0.29331E−02, A8=−0.84815E−03, A10=0.40327E−03, A12=0.47645E−03, A14=0.21365E−03
Eighth Surface
K=−0.49021E−01, A4=0.17792E−01, A6=0.53331E−03, A8=0.59862E−03, A10=−0.14526E−04, A12=−0.10324E−04, A14=0.86216E−05
Ninth Surface
K=−0.31540E+01, A4=−0.39857E−01, A6=0.16012E−01, A8=−0.20775E−02, A10=0.20495E−03, A12=−0.81553E−05, A14=130220E−06
Tenth Surface
K=0.127379E+02, A4=−0.44134E−01, A6=0.75013E−02, A8=−0.22670E−03, A10=0.11611E−03, A12=0.24952E−04, A14=−0.15619E−05
Eleventh Surface
K=−0.73425E+01, A4=−0.33704E−01, A6=0.64660E−02, A8=−0.91521E−03, A10=0.65512E−04, A12=−0.24773E−05, A14=0.56535E−07

The single lens data of the image pickup lens will be shown below.

| Lens | Front surface | Focal length (mm) |
|---|---|---|
| 1 | 2 | 3.273 |
| 2 | 4 | −5.272 |
| 3 | 6 | 9.480 |
| 4 | 8 | 3.692 |
| 5 | 10 | −2.447 |

The conditional expressions (1) to (8) of the image pickup lens will be shown below.

$(r7+r8)/(r7−r8)=3.178$ (1)

$SL/f=1.214$ (2)

$f4/f=0.798$ (3)

$f3/f4=2.568$ (4)

$v1−v2=32.6$ (5)

$n2=1.632$ (6)

$d6/f=0.104$ (7)

$L/2Y=0.79$ (8)

Figure 3:
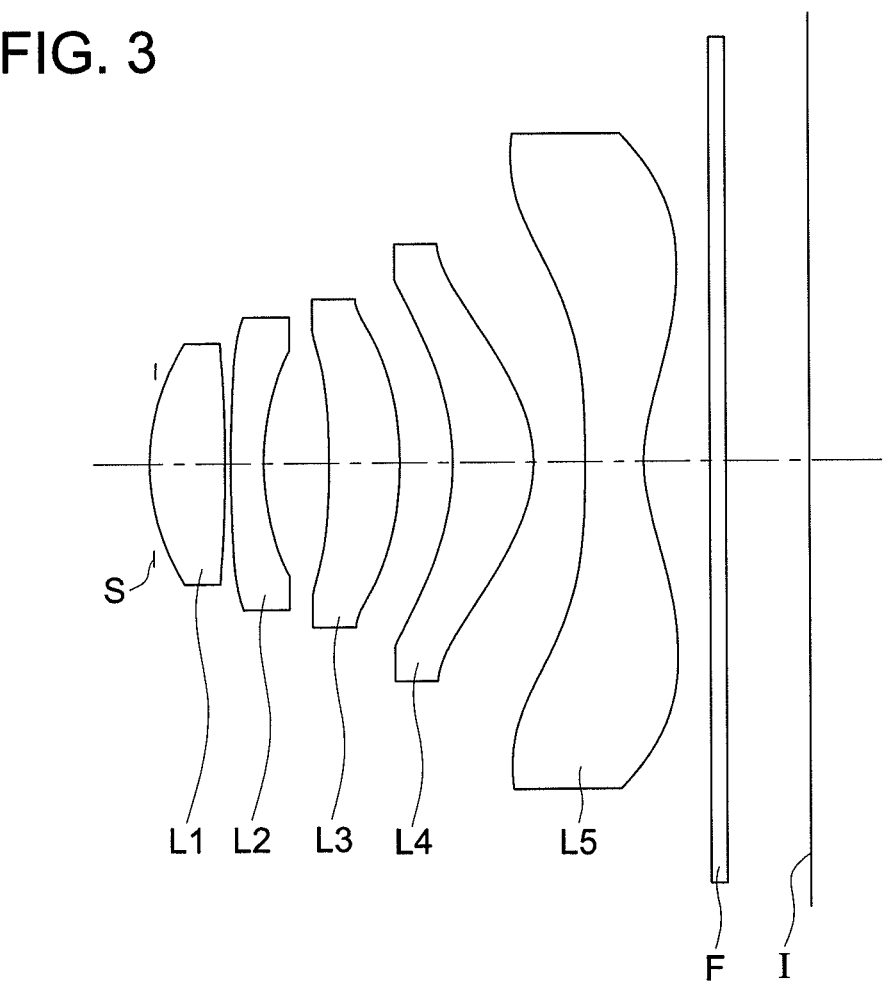
FIG. 3 shows a sectional view of the lens of Example 1.

FIG. 3 shows a sectional view of the image pickup lens. L1 represents the first lens, L2 represents the second lens, L3 represents the third lens, L4 represents the fourth lens, L5 represents the fifth lens, S represents the aperture stop, I represents the image pickup plane. Further, F represents a parallel flat plate assuming an optical low-pass filter, an IR cut-off filter, and a sealing glass of a package of a solid-state image pickup element. FIG. 4 shows aberration diagrams of the image pickup lens (spherical aberration, astigmatism, distortion and meridional coma).

In the present example, each lens is made of a plastic material, and it is possible to perform a partial movement such that the focal position is adjusted in an auto-focusing function and a function switching to macro-photography by moving the first lens L1 through the third lens L3 together.

Further, with shortening the total length of the image pickup lens, it is required that the position of the composite principal point of the total system of the image pickup lens is arranged at a position closer to the object, which makes a trend that the refractive power of first lens L1 becomes strong. It results in an increase of the decentration error sensitivity of the first lens L1. By performing the center adjustment by using first lens L1, an asymmetric blur in the image area, which is called as an uneven blur and caused in the entire system, can be reduced. The present example is provided under the assumption that this center adjustment is performed.

This center adjustment means that a lens is decentered from the optical axis to cancel out and reduce the uneven blur coming from factors of other than first lens L1. When a lens is decentered with respect to the optical axis, not only a parallel decentering but also a tilting decentring may be performed. Alternatively, the center adjustment may be performed for the purpose of reducing axial coma, rather than reducing the uneven blur.

Example 2

The total specification of the image pickup lens will be shown below.
f=5.67 mm
fB=0.5 mm
F=2.88
2Y=7.016 mm
ENTP=0 mm
EXTP=−2.75 mm
H1=−4.21 mm
H2=−5.17 mm The surface data of the image pickup lens will be shown below.

| Surface number | R | D | Nd | vd | Effective radius |
|---|---|---|---|---|---|
| 1(Stop) | ∞ | −0.210 | | | 0.98 |
| 2(*) | 1.789 | 0.762 | 1.54470 | 56.2 | 1.04 |
| 3(*) | 32.773 | 0.050 | | | 1.03 |
| 4(*) | 8.946 | 0.300 | 1.63200 | 23.4 | 1.03 |
| 5(*) | 2.457 | 0.787 | | | 1.03 |
| 6(*) | −7.885 | 0.863 | 1.54470 | 56.2 | 1.30 |
| 7(*) | −3.100 | 0.600 | | | 1.57 |
| 8(*) | −2.496 | 0.544 | 1.54470 | 56.2 | 1.79 |
| 9(*) | −1.854 | 0.910 | | | 1.96 |
| 10(*) | −3.401 | 0.45 | 1.54470 | 56.2 | 2.29 |
| 11(*) | 3.725 | 0.300 | | | 2.82 |
| 12 | ∞ | 0.145 | 1.51630 | 64.1 | 3.26 |
| 13 | ∞ | | | | 3.30 |

The aspheric surface coefficients of the image pickup lens will be shown below.
Second Surface
K=0.25491E+00, A4=0.16645E−02, A6=0.23998E−02, A8=−0.65481E−03, A10=0.17917E−03, A12=0.33827E−02, A14=−0.76817E−03
Third Surface
K=−0.30000E+02, A4=0.91582E−02, A6=0.92103E−02, A8=0.11014E−01, A10=0.27918E−02, A12=−0.57226E−02, A14=0.82212E−03
Fourth Surface
K=0.25687E+02, A4=−0.21604E−01, A6=0.22333E−01, A8=−0.13785E−02, A10=−0.25428E−02, A12=−0.19960E−02, A14=−0.55690E−02
Fifth Surface
K=−0.25703E+01, A4=0.25673E−01, A6=0.30181E−01, A8=−0.18004E−02, A10=−0.62950E−02, A12=−0.14319E−02, A14=−0.27246E−03
Sixth Surface
K=0.29426E+02, A4=−0.28196E−01, A6=−0.23682E−02, A8=0.72490E−03, A10=0.15095E−02, A12=0.39723E−03, A14=0.10607E−02
Seventh Surface
K=0.13046E+01, A4=−0.20555E−01, A6=0.14491E−02, A8=−0.22122E−02, A10=−0.58787E−04, A12=0.63240E−04, A14=0.45587E−04
Eighth Surface
K=0.55833E+00, A4=0.54873E−02, A6=−0.18708E−02, A8=0.10416E−02, A10=−0.99807E−04, A12=0.57013E−05, A14=0.30343E−04
Ninth Surface
K=−0.44160E+01, A4=−0.44178E−01, A6=0.10161E−01, A8=−0.21360E−02, A10=0.34269E−03, A12=0.99841E−05, A14=0.36643E−06
Tenth Surface
K=0.45260E+00, A4=−0.51468E−01, A6=0.93903E−02, A8=−0.98822E−04, A10=−0.10497E−03, A12=0.25662E−04, A14=−0.18668E−05
Eleventh Surface
K=−0.35812E+02, A4=−0.40083E−01, A6=0.56390E−02, A8=−0.71357E−03, A10=0.73512E−04, A12=−0.44111E−05, A14=0.10307E−06

The single lens data of the image pickup lens will be shown below.

| Lens | Front surface | Focal length (mm) |
|---|---|---|
| 1 | 2 | 3.445 |
| 2 | 4 | −5.457 |
| 3 | 6 | 8.818 |
| 4 | 8 | 10.193 |
| 5 | 10 | −3.193 |

The conditional expressions (1) to (8) of the image pickup lens will be shown below.

$$(r7+r8)/(r7-r8)=6.776 \tag{1}$$

$$SL/f=1.050 \tag{2}$$

$$f4/f=1.799 \tag{3}$$

$$f3/f4=0.865 \tag{4}$$

$$v1-v2=32.6 \tag{5}$$

$$n2=1.632 \tag{6}$$

$$d6/f=0.106 \tag{7}$$

$$L/2Y=0.86 \tag{8}$$

Figure 5:
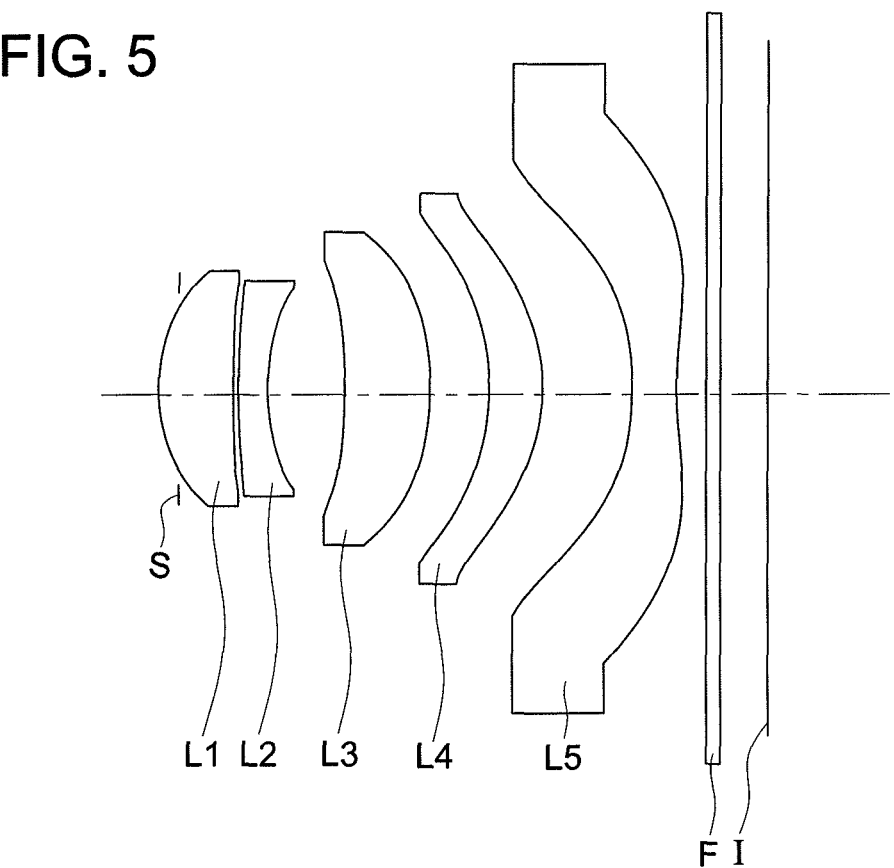
FIG. 5 shows a sectional view of the lens of Example 2.

FIG. 5 shows a sectional view of the image pickup lens of Example 2. L1 represents the first lens, L2 represents the second lens, L3 represents the third lens, L4 represents the fourth lens, L5 represents the fifth lens, S represents the aperture stop, I represents the image pickup plane. Further, F represents a parallel flat plate assuming an optical low-pass filter, an IR cut-off filter, and a sealing glass of a package of a solid-state image pickup element. FIG. 6 shows aberration diagrams of the image pickup lens of Example 2 (spherical aberration, astigmatism, distortion and meridional coma).

In the present example, each lens is made of a plastic material, and it is assumed to perform a partial movement such that the focal position is adjusted in an auto-focusing function and a function switching to macro-photography by moving the first lens L1 through the third lens L3 together.

The present example is provided under the assumption that this center adjustment is performed by using first lens L1.

Example 3

The total specification of the image pickup lens will be shown below.
f=4.75 mm
fB=0.49 mm
F=2.88
2Y=7.016 mm
ENTP=0 mm
EXTP=−2.91 mm
H1=−1.88 mm
H2=−4.25 mm The surface data of the image pickup lens will be shown below.

| Surface number | R | D | Nd | vd | Effective radius |
|---|---|---|---|---|---|
| 1(Stop) | ∞ | −0.073 | | | 0.84 |
| 2(*) | 1.934 | 0.667 | 1.49700 | 81.6 | 0.92 |
| 3(*) | −47.809 | 0.073 | | | 0.98 |
| 4(*) | 4.766 | 0.300 | 1.63200 | 23.4 | 1.03 |
| 5(*) | 2.342 | 0.589 | | | 1.05 |
| 6(*) | −9.253 | 0.632 | 1.54470 | 56.2 | 1.20 |
| 7(*) | −4.123 | 0.493 | | | 1.40 |
| 8(*) | −2.489 | 0.734 | 1.54470 | 56.2 | 1.59 |
| 9(*) | −1.198 | 0.446 | | | 1.87 |
| 10(*) | −14.235 | 0.539 | 1.54470 | 56.2 | 2.43 |
| 11(*) | 1.443 | 0.600 | | | 2.95 |
| 12 | ∞ | 0.145 | 1.5163 | 64.1 | 3.28 |
| 13 | ∞ | | | | 3.32 |

The aspheric surface coefficients of the image pickup lens will be shown below.
Second Surface
K=0.13772E+00, A4=−0.87773E−03, A6=0.18123E−02, A8=−0.60787E−02, A10=0.21615E−02, A12=0.58622E−02, A14=−0.28350E−02
Third Surface
K=0.30000E+02, A4=0.79602E−02, A6=−0.38490E−03, A8=0.10461E−01, A10=0.12913E−02, A12=−0.44337E−02, A14=0.43425E−02
Fourth Surface
K=0.35590E+01, A4=−0.36662E−01, A6=0.26138E−01, A8=−0.16470E−02, A10=0.43560E−02, A12=0.63515E−03, A14=−0.13734E−02
Fifth Surface
K=−0.49965E+01, A4=0.11670E−01, A6=0.23574E−01, A8=−0.49020E−02, A10=0.63906E−02, A12=0.16798E−02, A14=−0.72456E−03
Sixth Surface
K=0.27405E+02, A4=−0.37115E−01, A6=−0.68643E−02, A8=0.44963E−02, A10=0.98719E−03, A12=0.80935E−03, A14=0.14102E−02
Seventh Surface
K=0.24832E+01, A4=−0.24318E−01, A6=−0.36567E−02, A8=−0.10321E−02, A10=0.53577E−03, A12=0.60029E−03, A14=0.25186E−03
Eighth Surface
K=0.30214E+00, A4=0.11961E−01, A6=−0.30818E−02, A8=0.36932E−04, A10=−0.32668E−04, A12=0.12716E−04, A14=0.68304E−05
Ninth Surface
K=−0.33156E+01, A4=−0.39887E−01, A6=0.16135E−01, A8=−0.23062E−02, A10=0.13288E−03, A12=−0.15866E−04, A14=0.38298E−05
Tenth Surface
K=0.20282E+02, A4=−0.40585E−01, A6=0.76051E−02, A8=−0.24424E−03, A10=−0.12022E−03, A12=0.24613E−04, A14=−0.14874E−05
Eleventh Surface
K=−0.78153E+01, A4=−0.33411E−01, A6=0.64388E−02, A8=−0.94677E−03, A10=0.70562E−04, A12=−0.26550E−05, A14=0.54331E−07

The single lens data of the image pickup lens will be shown below.

| Lens | Front surface | Focal length (mm) |
|---|---|---|
| 1 | 2 | 3.756 |
| 2 | 4 | −7.651 |
| 3 | 6 | 13.085 |
| 4 | 8 | 3.530 |
| 5 | 10 | −2.376 |

The conditional expressions (1) to (8) of the image pickup lens will be shown below.

$(r7+r8)/(r7-r8)=2.855$  (1)

$SL/f=1.177$  (2)

$f4/f=0.743$  (3)

$f3/f4=3.707$  (4)

$v1-v2=58.2$  (5)

$n2=1.632$  (6)

$d6/f=0.104$  (7)

$L/2Y=0.79$  (8)

Figure 7:
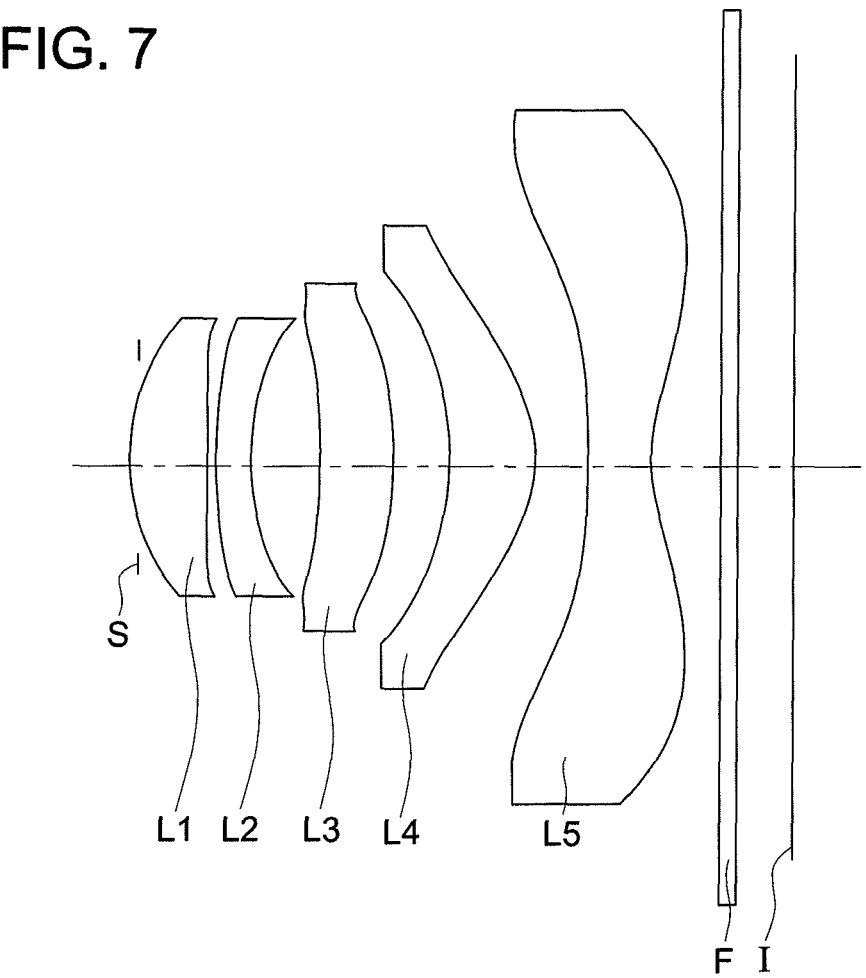
FIG. 7 shows a sectional view of the lens of Example 3.

FIG. 7 shows a sectional view of the image pickup lens of Example 3. L1 represents the first lens, L2 represents the second lens, L3 represents the third lens, L4 represents the fourth lens, L5 represents the fifth lens, S represents the aperture stop, I represents the image pickup plane. Further, F represents a parallel flat plate assuming an optical low-pass filter, an IR cut-off filter, and a sealing glass of a package of a solid-state image pickup element. FIG. 8 shows aberration diagrams of the image pickup lens of Example 3 (spherical aberration, astigmatism, distortion and meridional coma).

In the present example, first lens L1 is made of a molded glass lens and each of other lenses is made of a plastic material. The present example is assumed to perform a partial movement such that the focal position is adjusted in an auto-focusing function and a function switching to macro-photography by moving the first lens L1 through the third lens L3 together.

The present example is provided under the assumption that this center adjustment is performed by using first lens L1.

Example 4

The total specification of the image pickup lens will be shown below.
f=4.72 mm
fB=0.47 mm
F=2.88
2Y=7.016 mm
ENTP=0 mm
EXTP=−2.95 mm
H1=−1.8 mm
H2=−4.26 mm The surface data of the image pickup lens will be shown below.

| Surface number | R | D | Nd | vd | Effective radius |
|---|---|---|---|---|---|
| 1(Stop) | ∞ | −0.034 | | | 0.82 |
| 2(*) | 2.013 | 0.808 | 1.54470 | 56.2 | 0.91 |
| 3(*) | −5.260 | 0.050 | | | 1.00 |
| 4(*) | −15.895 | 0.300 | 1.58300 | 30.0 | 1.00 |
| 5(*) | 2.591 | 0.572 | | | 1.07 |
| 6(*) | −19.256 | 0.674 | 1.54470 | 56.2 | 1.25 |
| 7(*) | −3.813 | 0.455 | | | 1.48 |
| 8(*) | −2.126 | 0.699 | 1.54470 | 56.2 | 1.66 |
| 9(*) | −1.180 | 0.496 | | | 1.89 |
| 10(*) | −13.874 | 0.450 | 1.54470 | 56.2 | 2.42 |
| 11(*) | 1.492 | 0.600 | | | 2.93 |
| 12 | ∞ | 0.145 | 1.51630 | 64.1 | 3.28 |
| 13 | ∞ | | | | 3.32 |

The aspheric surface coefficients of the image pickup lens will be shown below.
Second Surface
K=0.10080E−01, A4=−0.28888E−02, A6=−0.39224E−02, A8=−0.10095E−01, A10=−0.64321E−03, A12=0.33368E−02, A14=−0.83855E−02
Third Surface
K=0.17593E+02, A4=0.68989E−02, A6=−0.24476E−01, A8=−0.51515E−04, A10=0.66266E−03, A12=−0.60012E−02, A14=−0.13841E−02
Fourth Surface
K=0.30000E+02, A4=−0.50797E−01, A6=0.19979E−01, A8=−0.86800E−02, A10=−0.17009E−02, A12=−0.22618E−02, A14=−0.17768E−02
Fifth Surface
K=−0.78722E+01, A4=0.15937E−01, A6=0.31316E−01, A8=−0.61323E−02, A10=0.44388E−02, A12=0.45833E−03, A14=−0.16503E−02
Sixth Surface
K=0.30000E+02, A4=−0.35955E−01, A6=−0.76287E−02, A8=0.37009E−02, A10=−0.80047E−04, A12=−0.58720E−05, A14=0.76127E−03
Seventh Surface
K=0.15645E+01, A4=−0.17291E−01, A6=−025578E−02, A8=−0.95646E−03, A10=0.34055E−03, A12=0.34349E−03, A14=0.45210E−04
Eighth Surface
K=−0.13631E+00, A4=0.18926E−01, A6=0.12474E−02, A8=0.88858E−03, A10=−0.19331E−04, A12=−0.29333E−04, A14=0.49655E−05
Ninth Surface
K=−0.31788E+01, A4=−0.40092E−01, A6=0.16751E−01, A8=−0.20937E−02, A10=0.19050E−03, A12=−0.10806E−04, A14=−0.10048E−05
Tenth Surface
K=0.12332E+02, A4=−0.44348E−01, A6=0.76586E−02, A8=−0.21917E−03, A10=−0.11885E−03, A12=0.24712E−04, A14=−0.15356E−05
Eleventh Surface
K=−0.80799E+01, A4=−0.35226E−01, A6=0.66057E−02, A8=−0.91396E−03, A10=0.65503E−04, A12=−0.26811E−05, A14=0.73417E−07

The single lens data of the image pickup lens will be shown below.

| Lens | Front surface | Focal length (mm) |
|---|---|---|
| 1 | 2 | 2.782 |
| 2 | 4 | −3.799 |
| 3 | 6 | 8.595 |
| 4 | 8 | 3.865 |
| 5 | 10 | −2.448 |

The conditional expressions (1) to (8) of the image pickup lens will be shown below.

$$(r7+r8)/(r7-r8)=3.497 \quad (1)$$

$$SL/f=1.192 \quad (2)$$

$$f4/f=0.818 \quad (3)$$

$$f3/f4=2.224 \quad (4)$$

$$v1-v2=26.0 \quad (5)$$

$$n2=1.583 \quad (6)$$

$$d6/f=0.096 \quad (7)$$

$$L/2Y=0.79 \quad (8)$$

Figure 9:
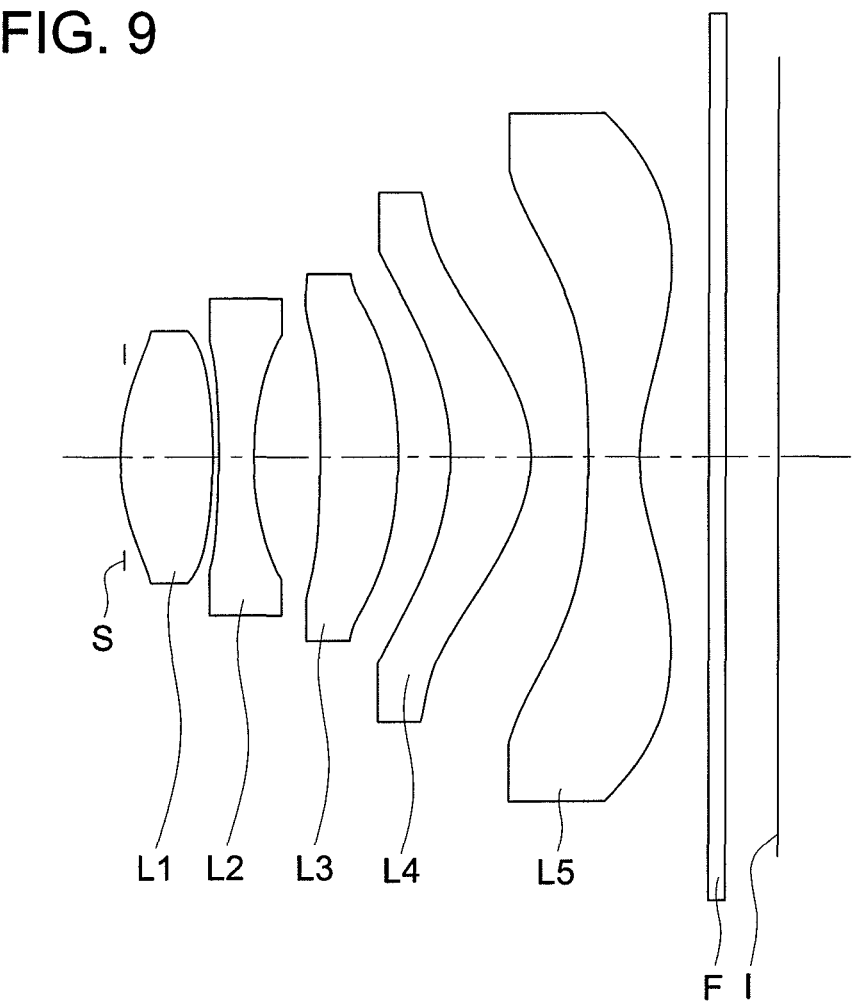
FIG. 9 shows a sectional view of the lens of Example 4.

FIG. 9 shows a sectional view of the image pickup lens of Example 4. L1 represents the first lens, L2 represents the second lens, L3 represents the third lens, L4 represents the fourth lens, L5 represents the fifth lens, S represents the aperture stop, I represents the image pickup plane. Further, F represents a parallel flat plate assuming an optical low-pass filter, an IR cut-off filter, and a sealing glass of a package of a solid-state image pickup element. FIG. 10 shows aberration diagrams of the image pickup lens of Example 4 (spherical aberration, astigmatism, distortion and meridional coma).

In the present example, each of the lenses is made of a plastic material. The present example is assumed to perform a partial movement such that the focal position is adjusted in an auto-focusing function and a function switching to macro-photography by moving the first lens L1 through the third lens L3 together.

The present example is provided under the assumption that this center adjustment is performed by using first lens L1.

Example 5

The total specification of the image pickup lens will be shown below.
f=4.76 mm
fB=0.51 mm
F=2.88

2Y=7.016 mm
ENTP=0 mm
EXTP=−2.88 mm
H1=−1.94 mm
H2=−4.25 mm

The surface data of the image pickup lens will be shown below.

| Surface number | R | D | Nd | vd | Effective radius |
|---|---|---|---|---|---|
| 1(Stop) | ∞ | −0.077 | | | 0.84 |
| 2(*) | 1.919 | 0.657 | 1.49700 | 81.6 | 0.93 |
| 3(*) | 411.614 | 0.052 | | | 0.99 |
| 4(*) | 3.420 | 0.321 | 2.00020 | 19.3 | 1.04 |
| 5(*) | 2.290 | 0.596 | | | 1.02 |
| 6(*) | −7.380 | 0.590 | 1.54470 | 56.2 | 1.17 |
| 7(*) | −4.183 | 0.457 | | | 1.37 |
| 8(*) | −2.723 | 0.791 | 1.54470 | 56.2 | 1.56 |
| 9(*) | −1.204 | 0.471 | | | 1.85 |
| 10(*) | −14.440 | 0.520 | 1.54470 | 56.2 | 2.43 |
| 11(*) | 1.429 | 0.600 | | | 2.94 |
| 12 | ∞ | 0.145 | 1.51630 | 64.1 | 3.26 |
| 13 | ∞ | | | | 3.30 |

The aspheric surface coefficients of the image pickup lens will be shown below.

Second Surface
  K=0.14541E+00, A4=−0.77607E−03, A6=0.24189E−02, A8=−0.58371E−02, A10=0.19501E−02, A12=0.56443E−02, A14=−0.24883E−02

Third Surface
  K=−0.30000E+02, A4=0.65178E−02, A6=0.79156E−02, A8=0.11430E−01, A10=−0.99688E−03, A12=−0.63741E−02, A14=0.27807E−02

Fourth Surface
  K=0.35535E+01, A4=−0.35136E−01, A6=0.23600E−01, A8=−0.35482E−02, A10=0.29306E−02, A12=−0.27257E−03, A14=−0.19308E−02

Fifth surface
  K=−0.41861E+01, A4=0.14176E−01, A6=0.23207E−01, A8=−0.40956E−02, A10=0.74584E−02, A12=0.16841E−02, A14=−0.17571E−02

Sixth Surface
  K=0.28776E+02, A4=−0.43642E−01, A6=−0.75156E−02, A8=0.62048E−02, A10=0.23665E−02, A12=0.19778E−02, A14=0.23745E−02

Seventh Surface
  K=0.33134E+01, A4=−0.30011E−01, A6=−0.44610E−02, A8=−0.13122E−02, A10=0.78615E−03, A12=0.85884E−03, A14=0.42316E−03

Eighth Surface
  K=0.45439E+00, A4=3.10788E−01, A6=−0.47480E−02, A8=0.99177E−05, A10=−0.10193E−03, A12=−0.15417E−04, A14=0.15175E−04

Ninth Surface
  K=−0.33457E+01, A4=−0.40916E−01, A6=0.16615E−01, A8=−0.24657E−02, A10=0.75700E−04, A12=−0.18737E−04, A14=0.77174E−05

Tenth Surface
  K=0.17625E+02, A4=−0.42342E−01, A6=0.79897E−02, A8=−0.23043E−03, A10=−0.12757E−03, A12=0.24049E−04, A14=−0.13779E−05

Eleventh Surface
  K=−0.76520E+01, A4=−0.34264E−01, A6=0.65689E−02, A8=−0.97420E−03, A10=0.75519E−04, A12=−0.30450E−05, A14=0.64750E−07

The single lens data of the image pickup lens will be shown below.

| Lens | Front surface | Focal length (mm) |
|---|---|---|
| 1 | 2 | 3.877 |
| 2 | 4 | −8.083 |
| 3 | 6 | 16.644 |
| 4 | 8 | 3.349 |
| 5 | 10 | −2.361 |

The conditional expressions (1) to (8) of the image pickup lens will be shown below.

$$(r7+r8)/(r7-r8)=2.585 \tag{1}$$

$$SL/f=1.173 \tag{2}$$

$$f4/f=0.703 \tag{3}$$

$$f3/f4=4.970 \tag{4}$$

$$v1-v2=62.3 \tag{5}$$

$$n2=2.000 \tag{6}$$

$$d6/f=0.099 \tag{7}$$

$$L/2Y=0.79 \tag{8}$$

Figure 11:
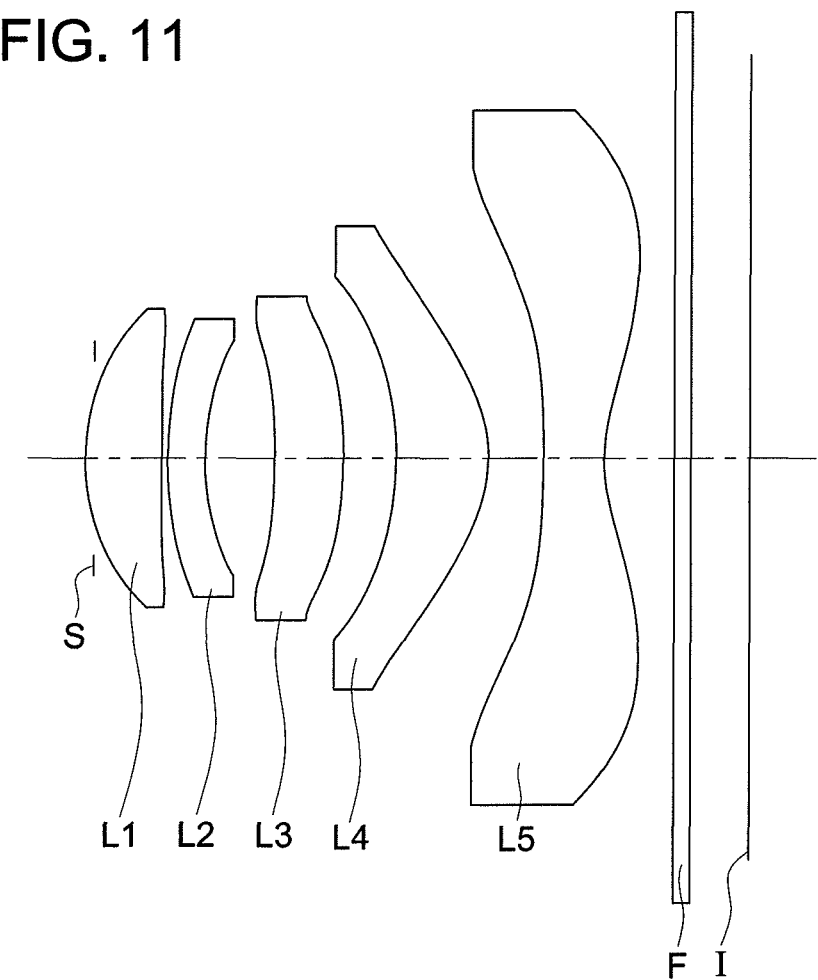
FIG. 11 shows a sectional view of the lens of Example 5.

FIG. 11 shows a sectional view of the image pickup lens of Example 5. L1 represents the first lens, L2 represents the second lens, L3 represents the third lens, L4 represents the fourth lens, L5 represents the fifth lens, S represents the aperture stop, I represents the image pickup plane. Further, F represents a parallel flat plate assuming an optical low-pass filter, an IR cut-off filter, and a sealing glass of a package of a solid-state image pickup element. FIG. 12 shows aberration diagrams of the image pickup lens of Example 5 (spherical aberration, astigmatism, distortion and meridional coma).

In the present example, each of first lens and second lens is made of a molded glass lens and each of the other lenses is made of a plastic material. The present example is assumed to perform a partial movement such that the focal position is adjusted in an auto-focusing function and a function switching to macro-photography by moving the first lens L1 through the third lens L3 together.

The present example is provided under the assumption that this center adjustment is performed by using first lens L1.

Example 6

The total specification of the image pickup lens will be shown below.
f=5.02 mm
fB=0.7 mm
F=2.88
2Y=7.016 mm
ENTP=0 mm
EXTP=−3.36 mm
H1=−1.17 mm
H2=−4.31 mm The surface data of the image pickup lens will be shown below.

| Surface number | R | D | Nd | vd | Effective radius |
|---|---|---|---|---|---|
| 1(Stop) | ∞ | −0.052 | | | 0.87 |
| 2(*) | 1.963 | 0.740 | 1.54470 | 56.2 | 0.99 |
| 3(*) | −25.320 | 0.053 | | | 1.03 |
| 4(*) | 6.156 | 0.300 | 1.63200 | 23.4 | 1.05 |
| 5(*) | 2.124 | 0.706 | | | 1.07 |
| 6(*) | −7.235 | 0.700 | 1.54470 | 56.2 | 1.26 |
| 7(*) | −3.210 | 0.458 | | | 1.51 |
| 8(*) | −2.056 | 0.813 | 1.54470 | 56.2 | 1.69 |
| 9(*) | −1.110 | 0.400 | | | 1.92 |
| 10(*) | −19.798 | 0.491 | 1.54470 | 56.2 | 2.49 |
| 11(*) | 1.505 | 0.600 | | | 2.92 |
| 12 | ∞ | 0.145 | 1.51630 | 64.1 | 3.24 |
| 13 | ∞ | | | | 3.27 |

The aspheric surface coefficients of the image pickup lens will be shown below.

Second Surface

K4.22872E+00, A4=0.11258E−02, A6=0.35117E−02, A8=−0.63204E−02, A10=0.79095E−03, A12=0.54005E−02, A14=−0.20981E−02

Third Surface

K=−0.30000E+02, A4=0.14026E−01, A6=−0.80919E−02, A8=0.71966E−02, A10=0.20250E−02, A12=−0.43477E−02, A14=0.22859E−02

Fourth Surface

K=−0.46024E+01, A4=−0.42217E−01, A6=0.25928E−01, A8=−0.38047E−02, A10=0.14132E−02, A12=−0.74428E−03, A14=−0.18697E−02

Fifth Surface

K=−0.51139E+01, A4=0.15116E−01, A6=0.27060E−01, A8=−0.51308E−02, A10=0.53222E−02, A12=0.53802E−03, A14=−0.16078E−02

Sixth Surface

K=0.22607E+02, A4=−0.34517E−01, A6=−0.95045E−02, A8=0.32882E−02, A10=0.10679E−03, A12=0.41400E−03, A14=0.12149E−02

Seventh Surface

K=0.16520E+01, A4=−0.16488E−01, A6=−0.28195E−02, A8=−0.12173E−02, A10=0.72136E−04, A12=0.27934E−03, A14=0.11888E−03

Eighth Surface

K=−0.11817E+00, A4=0.98232E−02, A6=0.13191E−02, A8=0.84171E−03, A10=−0.45299E−04, A12=−0.19156E−04, A14=0.21201E−04

Ninth Surface

K=−0.29968E+01, A4=−0.53098E−01, A6=0.15866E−01, A8=−0.21642E−02, A10=0.21132E−03, A12=0.34310E−06, A14=0.16613E−05

Tenth Surface

K=−0.33298E+01, A4=−0.43356E−01, A6=0.74354E−02, A8=−0.25845E−03, A10=−0.12248E−03, A12=0.24598E−04, A14=−0.13977E−05

Eleventh Surface

K=−0.84033E+01, A4=−0.37344E−01, A6=0.65139E−02, A8=−0.88701E−03, A10=0.66015E−04, A12=−0.28215E−05, A14=0.77371E−07

The single lens data of the image pickup lens will be shown below.

| Lens | Front surface | Focal length (mm) |
|---|---|---|
| 1 | 2 | 3.376 |
| 2 | 4 | −5.282 |
| 3 | 6 | 9.982 |
| 4 | 8 | 3.397 |
| 5 | 10 | −2.547 |

The conditional expressions (1) to (8) of the image pickup lens will be shown below.

$$(r7+r8)/(r7-r8)=3.344 \tag{1}$$

$$SL/f=1.198 \tag{2}$$

$$f4/f=0.677 \tag{3}$$

$$f3/f4=2.938 \tag{4}$$

$$v1-v2=32.6 \tag{5}$$

$$n2=1.632 \tag{6}$$

$$d6/f=0.091 \tag{7}$$

$$L/2Y=0.85 \tag{8}$$

Figure 13:
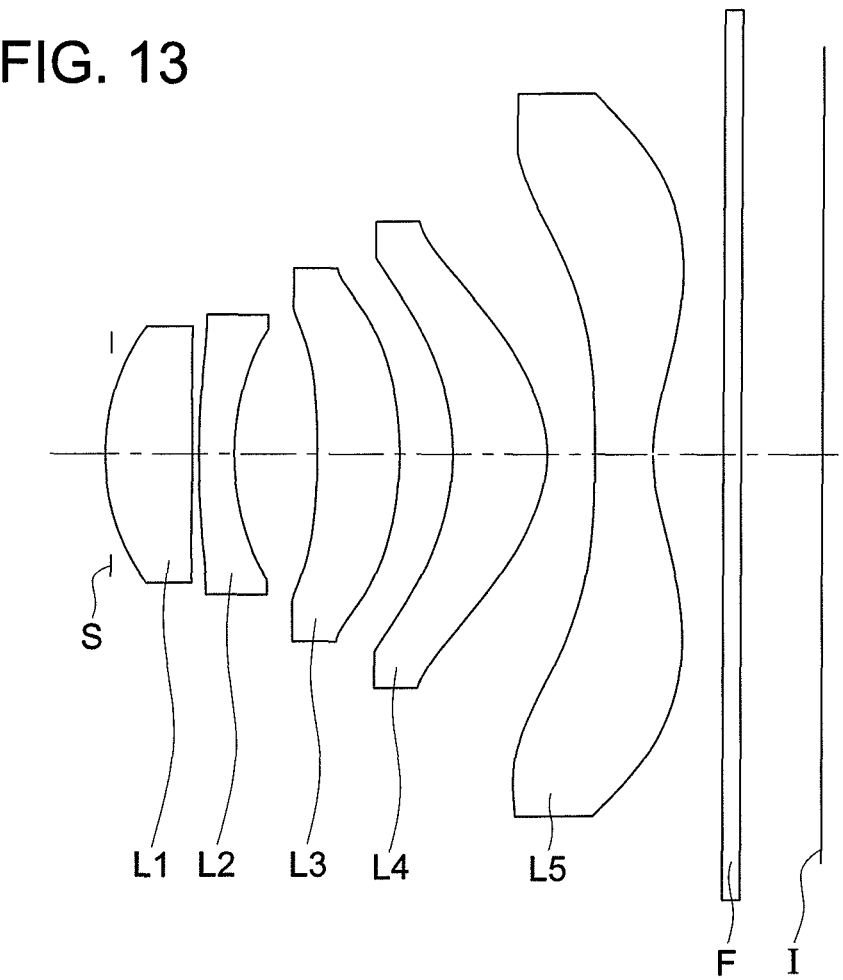
FIG. 13 shows a sectional view of the lens of Example 6.

FIG. 13 shows a sectional view of the image pickup lens of Example 6. L1 represents the first lens, L2 represents the second lens, L3 represents the third lens, L4 represents the fourth lens, L5 represents the fifth lens, S represents the aperture stop, I represents the image pickup plane. Further, F represents a parallel flat plate assuming an optical low-pass filter, an IR cut-off filter, and a sealing glass of a package of a solid-state image pickup element. FIG. 14 shows aberration diagrams of the image pickup lens of Example 6 (spherical aberration, astigmatism, distortion and meridional coma).

In the present example, each of lenses is made of a plastic material. The present example is assumed to perform a partial movement such that the focal position is adjusted in an auto-focusing function and a function switching to macro photography by moving the first lens L1 through the third lens L3 together.

The present example is provided under the assumption that this center adjustment is performed by using first lens L1.

Example 7

The total specification of the image pickup lens will be shown below.

f=4.67 mm
fB=0.7 mm
F=2.8
2Y=7.016 mm
ENTP=0 mm
EXTP=−3.89 mm
H1=−0.08 mm
H2=−3.97 mm

The surface data of the image pickup lens will be shown below.

| Surface number | R | D | Nd | νd | Effective radius |
|---|---|---|---|---|---|
| 1(Stop) | ∞ | 0.050 | | | 0.83 |
| 2(*) | 7.940 | 0.800 | 1.54470 | 56.2 | 0.85 |
| 3(*) | −2.469 | 0.101 | | | 1.07 |
| 4(*) | 3.895 | 0.426 | 1.63200 | 23.4 | 1.26 |
| 5(*) | 1.632 | 1.001 | | | 1.32 |
| 6(*) | 26.607 | 1.175 | 1.54470 | 56.2 | 1.82 |
| 7(*) | −3.200 | 0.400 | | | 2.00 |
| 8(*) | −1.734 | 0.486 | 1.54470 | 56.2 | 2.09 |
| 9(*) | −1.029 | 0.100 | | | 2.16 |
| 10(*) | 3.454 | 0.533 | 1.54470 | 56.2 | 2.46 |
| 11(*) | 0.917 | 0.600 | | | 3.01 |
| 12 | ∞ | 0.300 | 1.51630 | 64.1 | 3.20 |
| 13 | ∞ | | | | 3.27 |

The aspheric surface coefficients of the image pickup lens will be shown below.

Second Surface

K=−0.30000E+02, A4=−0.25530E−01, A6=−0.10297E−01, A8=−0.15329E−01, A10=0.10320E−01, A12=−0.51000E−03, A14=−0.20491E−02

Third Surface

K=−0.22044E+01, A4=0.40354E−02, A6=−0.37192E−01, A8=0.14675E−01, A10=0.47227E−03, A12=−0.65765E−02, A14=0.31637E−02

Fourth Surface

K=−0.10853E+02, A4=−0.32693E−01, A6=0.25188E−01, A8=−0.10304E−01, A10=0.23617E−02, A12=0.16228E−02, A14=−0.67773E−03

Fifth Surface

K=−0.45099E+01, A4=−0.79349E−02, A6=0.16704E−01, A8=−0.97214E−02, A10=0.26187E−02, A12=0.39605E−03, A14=−0.19963E−03

Sixth Surface

K=0.90364E+01, A4=0.68755E−02, A6=−0.10416E−01, A8=0.35310E−02, A10=0.25200E−03, A12=−0.34061E−03, A14=0.47853E−04

Seventh Surface

K=0.59479E+00, A4=0.12962E−01, A6=−0.40194E−02, A8=−0.11527E−03, A10=0.11669E−03, A12=0.28478E−04, A14=−0.49433E−05

Eighth Surface

K=−0.43179E+00, A4=0.37096E−01, A6=0.98140E−03, A8=0.92866E−03, A10=−0.30222E−04, A12=−0.28923E−04, A14=0.62055E−05

Ninth Surface

K=−0.37450E+01, A4=−0.55748E−01, A6=0.20347E−01, A8=−0.20951E−02, A10=0.20454E−03, A12=−0.94418E−05, A14=−0.12837E−05

Tenth Surface

K=−0.56635E+01, A4=−0.80954E−01, A6=0.10365E−01, A8=−0.31383E−05, A10=0.13946E−03, A12=0.20848E−04, A14=−0.10865E−05

Eleventh Surface

K=−0.43287E+01, A4=−0.39994E−01, A6=0.66722E−02, A8=−0.91607E−03, A10=0.85074E−04, A12=−0.46694E−05, A14=0.10462E−06

The single lens data of the image pickup lens will be shown below.

| Lens | Front surface | Focal length (mm) |
|---|---|---|
| 1 | 2 | 3.554 |
| 2 | 4 | −4.796 |
| 3 | 6 | 5.319 |
| 4 | 8 | 3.741 |
| 5 | 10 | −2.475 |

The conditional expressions (1) to (8) of the image pickup lens will be shown below.

$(r7+r8)/(r7−r8)=3.922$ (1)

$SL/f=1.407$ (2)

$f4/f=0.801$ (3)

$f3/f4=1.422$ (4)

$v1−v2=32.6$ (5)

$n2=1.632$ (6)

$d6/f=0.086$ (7)

$L/2Y=0.93$ (8)

Figure 15:
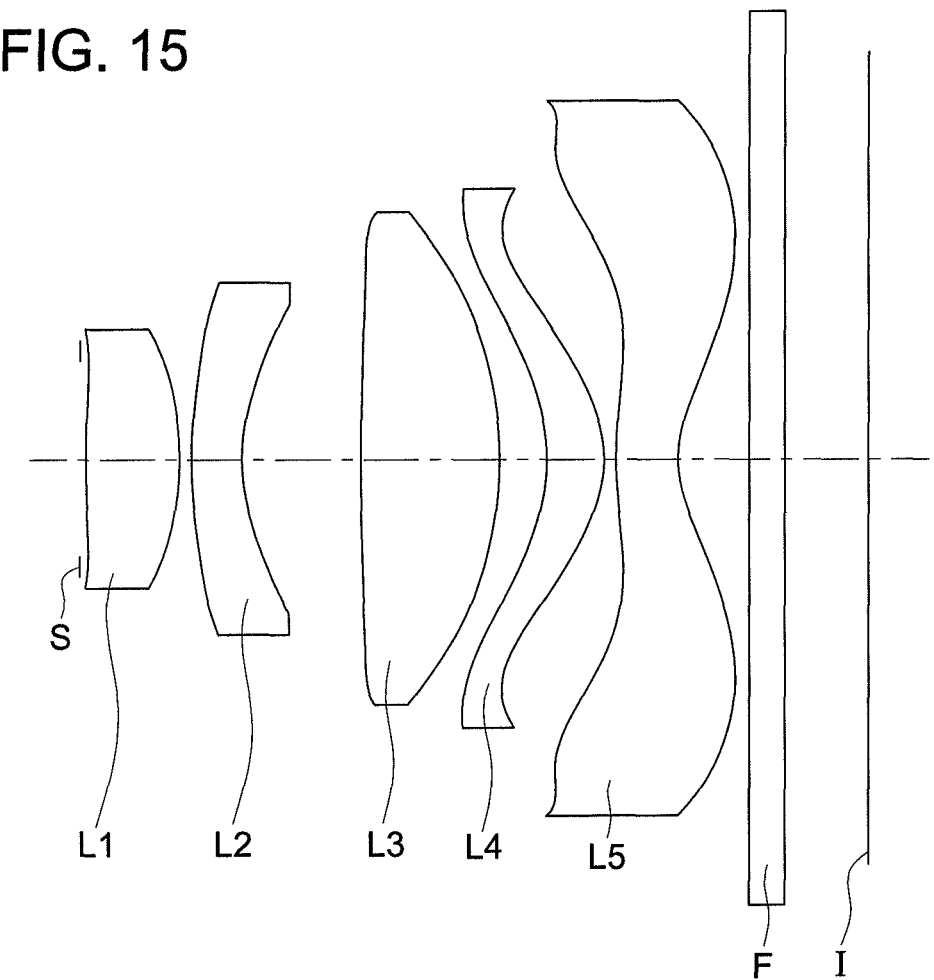
FIG. 15 shows a sectional view of the lens of Example 7.

FIG. 15 shows a sectional view of the image pickup lens of Example 7. L1 represents the first lens, L2 represents the second lens, L3 represents the third lens, L4 represents the fourth lens, L5 represents the fifth lens, S represents the aperture stop, I represents the image pickup plane. Further, F represents a parallel flat plate assuming an optical low-pass filter, an IR cut-off filter, and a sealing glass of a package of a solid-state image pickup element. FIG. 16 shows aberration diagrams of the image pickup lens of Example 7 (spherical aberration, astigmatism, distortion and meridional coma).

In the present example, each of lenses is made of a plastic material. The present example is assumed to perform a partial movement such that the focal position is adjusted in an auto-focusing function and a function switching to macro-photography by moving the first lens L1 through the third lens L3 together.

The present example is provided under the assumption that this center adjustment is performed by using first lens L1.

Example 8

The total specification of the image pickup lens will be shown below.

f=4.67 mm fB=0.79 mm

F=2.8

2Y=7.016 mm

ENTP=0 mm

EXTP=−3.82 mm

H1=−0.06 mm

H2=−3.88 mm

The surface data of the image pickup lens will be shown below.

| Surface number | R | D | Nd | vd | Effective radius |
|---|---|---|---|---|---|
| 1(Stop) | ∞ | 0.000 | | | 0.83 |
| 2(*) | 4.338 | 1.060 | 1.54470 | 56.2 | 0.85 |
| 3(*) | −3.261 | 0.050 | | | 1.13 |
| 4(*) | 3.777 | 0.426 | 1.63200 | 23.4 | 1.26 |
| 5(*) | 1.655 | 0.730 | | | 1.32 |
| 6(*) | −15.301 | 0.834 | 1.54470 | 56.2 | 1.56 |
| 7(*) | −3.268 | 0.301 | | | 1.75 |
| 8(*) | −2.158 | 0.68 | 1.54470 | 56.2 | 1.98 |
| 9(*) | −1.250 | 0.100 | | | 2.11 |
| 10(*) | 4.019 | 0.731 | 1.54470 | 56.2 | 2.49 |
| 11(*) | 1.167 | 0.600 | | | 2.98 |
| 12 | ∞ | 0.300 | 1.51630 | 64.1 | 3.18 |
| 13 | ∞ | | | | 3.24 |

The aspheric surface coefficients of the image pickup lens will be shown below.

Second Surface

K=−0.11529E+01, A4=−0.12315E−01, A6=−0.17373E−02, A8=−0.10136E−01, A10=0.85871E−02, A12=−0.57045E−03, A14=−0.20491E−02

Third Surface

K=−0.46540E+01, A4=0.16705E−01, A6=−0.31022E−01, A8=0.12878E−01, A10=0.17465E−02, A12=−0.52988E−02, A14=0.19910E−02

Fourth Surface

K=−0.56239E+01, A4=−0.30406E−01, A6=0.22674E−01, A8=−0.11014E−01, A10=0.19630E−02, A12=0.15868E−02, A14=−0.58687E−03

Fifth Surface

K=−0.45094E+01, A4=0.50515E−02, A6=0.16648E−01, A8=−0.11130E−01, A10=0.27593E−02, A12=0.70672E−03, A14=−0.34114E−03

Sixth Surface

K=0.80000E+02, A4=−0.63214E−02, A6=−0.84416E−02, A8=0.56682E−02, A10=0.59386E−03, A12=−0.34629E−03, A14=3.32661E−04

Seventh Surface

K=0.19417E+01, A4=0.44144E−02, A6=−0.33790E−02, A8=0.74821E−03, A10=0.34837E−03, A12=0.78097E−04, A14=0.46394E−05

Eighth Surface

K=−0.21741E+00, A4=0.45377E−01, A6=−0.24638E−03, A8=0.45745E−03, A10=−0.83017E−05, A12=−0.18840E−04, A14=0.24646E−05

Ninth Surface

K=−0.35183E+01, A4=−0.33241E−01, A6=0.18086E−01, A8=−0.22745E−02, A10=0.16508E−03, A12=−0.14002E−04, A14=0.26538E−06

Tenth Surface

K=−0.65715E+01, A4=−0.64437E−01, A6=0.96449E−02, A8=−0.11326E−03, A10=−0.14314E−03, A12=0.21400E−04, A14=−0.10765E−05

Eleventh Surface

K=−0.46352E+01, A4=−0.35746E−01, A6=0.61166E−02, A8=−0.86560E−03, A10=0.73686E−04, A12=−0.36214E−05, A14=−0.86848E−07

The single lens data of the image pickup lens will be shown below.

| Lens | Front surface | Focal length (mm) |
|---|---|---|
| 1 | 2 | 3.594 |
| 2 | 4 | −5.055 |
| 3 | 6 | 7.446 |
| 4 | 8 | 4.314 |
| 5 | 10 | −3.317 |

The conditional expressions (1) to (8) of the image pickup lens will be shown below.

$(r7+r8)/(r7−r8)=3.753$ (1)

$SL/f=1.392$ (2)

$f4/f=0.923$ (3)

$f3/f4=1.726$ (4)

$v1−v2=32.6$ (5)

$n2=1.632$ (6)

$d6/f=0.064$ (7)

$L/2Y=0.93$

Figure 17:
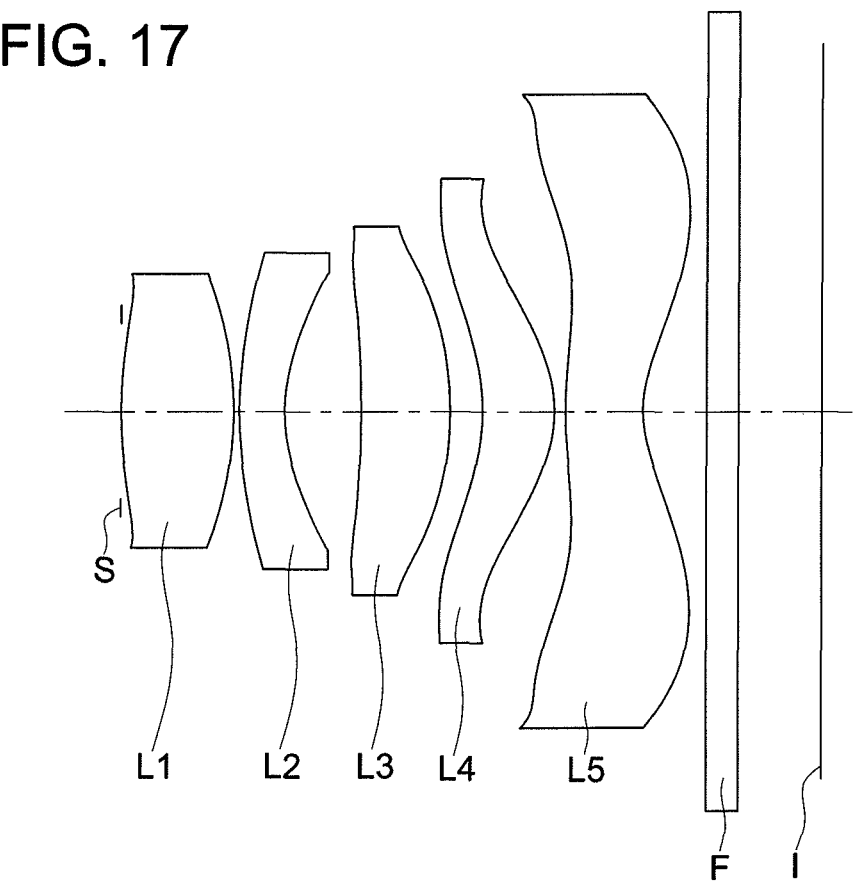
FIG. 17 shows a sectional view of the lens of Example 8.

FIG. 17 shows a sectional view of the image pickup lens of Example 8. L1 represents the first lens, L2 represents the second lens, L3 represents the third lens, L4 represents the fourth lens, L5 represents the fifth lens, S represents the aperture stop, I represents the image pickup plane. Further, F represents a parallel flat plate assuming an optical low-pass filter, an IR cut-off filter, and a sealing glass of a package of a solid-state image pickup element. FIG. 18 shows aberration diagrams of the image pickup lens of Example 8 (spherical aberration, astigmatism, distortion and meridional coma).

In the present example, each of lenses is made of a plastic material. The present example is assumed to perform a partial movement such that the focal position is adjusted in an auto-focusing function and a function switching to macro-photography by moving the first lens L1 through the third lens L3 together.

The present example is provided under the assumption that this center adjustment is performed by using first lens L1.

Example 9

The total specification of the image pickup lens will be shown below.

f=5.58 mm
fB=0.56 mm
F=2.0
2Y=7.016 mm
ENTP=0 mm
EXTP=−3.41 mm
H1=−2.26 mm
H2=−5.02 mm

The surface data of the image pickup lens will be shown below.

| Surface number | R | D | Nd | vd | Effective radius |
|---|---|---|---|---|---|
| 1(Stop) | ∞ | −0.380 | | | 1.39 |
| 2(*) | 2.421 | 0.920 | 1.54470 | 56.2 | 1.46 |
| 3(*) | −25.589 | 0.050 | | | 1.43 |
| 4(*) | 3.179 | 0.321 | 1.63200 | 23.4 | 1.41 |
| 5(*) | 1.718 | 1.008 | | | 1.40 |
| 6(*) | −13.442 | 0.709 | 1.54470 | 56.2 | 1.60 |
| 7(*) | −3.644 | 0.612 | | | 1.76 |
| 8(*) | −2.678 | 0.770 | 1.54470 | 56.2 | 1.9 |
| 9(*) | −1.430 | 0.520 | | | 2.16 |
| 10(*) | −9.920 | 0.450 | 1.54470 | 56.2 | 2.73 |
| 11(*) | 1.938 | 0.600 | | | 3.03 |
| 12 | ∞ | 0.145 | 1.51630 | 64.1 | 3.33 |
| 13 | ∞ | | | | 3.35 |

The aspheric surface coefficients of the image pickup lens will be shown below.

Second Surface

K=0.36148E+00, A4=0.17371E−02, A6=−0.93252E−04, A8=−0.30737E−03, A10=0.10423E−02, A12=−0.50599E−03, A14=0.95554E−04

Third Surface

K=−0.30000E+02, A4=0.21423E−01, A6=−0.59707E−02, A8=0.15453E−02, A10=0.51980E−03, A12=−0.83832E−03, A14=0.17232E−03

Fourth Surface

K=−0.43318E+00, A4=−0.57637E−01, A6=0.21407E−01, A8=−0.96490E−02, A10=0.18300E−02, A12=−0.81816E−03, A14=0.14616E−03

Fifth Surface

K=−0.35304E+01, A4=−0.58482E−02, A6=0.15046E−01, A8=−0.84000E−02, A10=0.47172E−02, A12=−0.25772E−02, A14=0.65056E−03

Sixth Surface

K=0.23361E+02, A4=−0.19346E−01, A6=0.27182E−04, A8=0.57107E−03, A10=−0.29448E−03, A12=0.55760E−03, A14=−0.12701E−03

Seventh Surface

K=0.24510E+01, A4=−0.11982E−01, A6=0.47194E−02, A8=−0.10093E−02, A10=0.31052E−03, A12=0.75567E−04, A14=0.70094E−05

Eighth Surface

K=0.12384E+00, A4=−0.88676E−02, A6=0.43753E−02, A8=−0.34489E−03, A10=0.16651E−04, A12=−0.13926E−05, A14=−0.24574E−07

Ninth Surface

K=−0.35852E+01, A4=−0.46635E−01, A6=0.13524E−01, A8=−0.26772E−02, A10=0.44420E−03, A12=−0.86058E−05, A14=−0.28156E−05

Tenth Surface

K=0.67292E+01, A4=−0.47747E−01, A6=0.10058E−01, A8−0.47748E−03, A10=−0.18904E−03, A12=0.37936E−04, A14=−0.20468E−05

Eleventh Surface

K=−0.98800E+01, A4=−0.37219E−01, A6=0.67687E−02, A8=−0.98376E−03, A10=0.89767E−04, A12=−0.53208E−05, A14=0.16451E−06

The single lens data of the image pickup lens will be shown below.

| Lens | Front surface | Focal length (mm) |
|---|---|---|
| 1 | 2 | 4.108 |
| 2 | 4 | −6.463 |
| 3 | 6 | 8.949 |
| 4 | 8 | 4.628 |
| 5 | 10 | −2.937 |

The conditional expressions (1) to (8) of the image pickup lens will be shown below.

$$(r7+r8)/(r7-r8)=3.292 \tag{1}$$

$$SL/f=1.117 \tag{2}$$

$$f4/f=0.824 \tag{3}$$

$$f3/f4=1.934 \tag{4}$$

$$v1-v2=32.6 \tag{5}$$

$$n2=1.632 \tag{6}$$

$$d6/f=0.110 \tag{7}$$

$$L/2Y=0.94 \tag{8}$$

Figure 19:
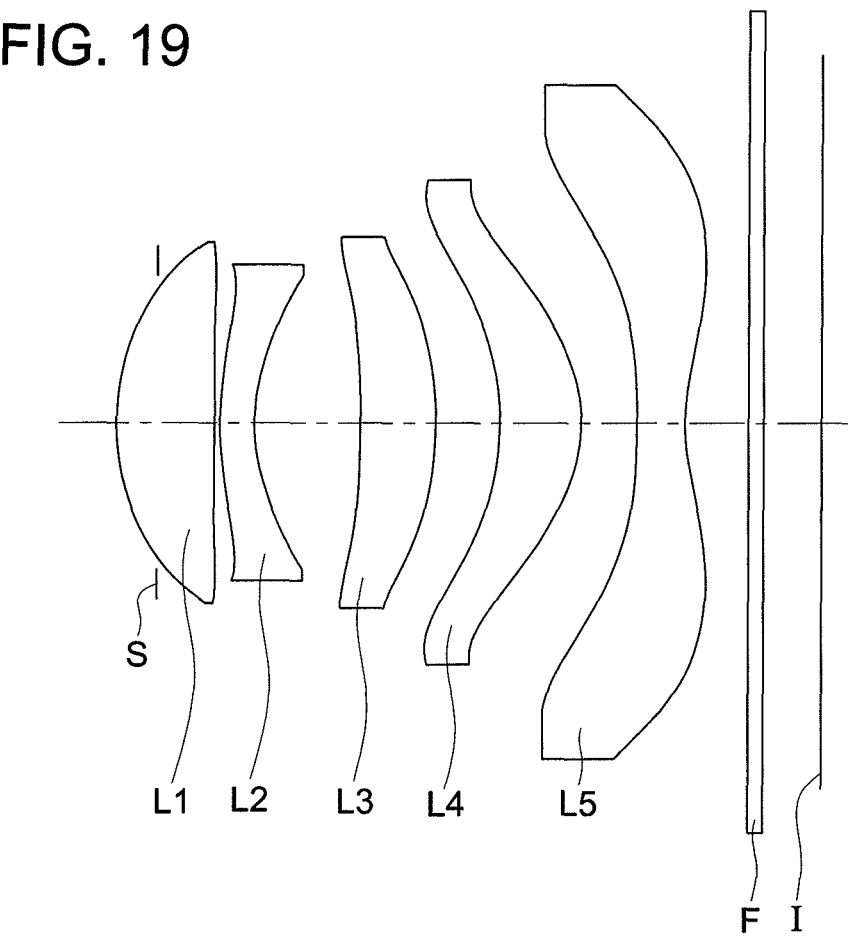
FIG. 19 shows a sectional view of the lens of Example 9.

FIG. 19 shows a sectional view of the image pickup lens of Example 9. L1 represents the first lens, L2 represents the second lens, L3 represents the third lens, L4 represents the fourth lens, L5 represents the fifth lens, S represents the aperture stop, I represents the image pickup plane. Further, F represents a parallel flat plate assuming an optical low-pass filter, an IR cut-off filter, and a sealing glass of a package of a solid-state image pickup element. FIG. 20 shows aberration diagrams of the image pickup lens of Example 9 (spherical aberration, astigmatism, distortion and meridional coma).

In the present example, each of lenses is made of a plastic material. The present example is assumed to perform a partial movement such that the focal position is adjusted in an auto-focusing function and a function switching to macro-photography by moving the first lens L1 through the third lens L3 together.

The present example is provided under the assumption that this center adjustment is performed by using first lens L1.

Herein, a plastic material greatly changes in refractive index when the temperature changes. Therefore, a structure that all of the first lens through the fifth lens are formed by plastic lenses causes a problem that the image point position of the total system of the image pickup lens fluctuates when the environment temperature changes.

It has recently found that the change of a plastic material coming from a temperature change can be reduced by mixing inorganic microparticles into a plastic material. Concretely, when microparticles are mixed into a plastic material, light scatters therein and the transmittance is deteriorated in general, and the material is difficult to be used as an optical material. However, by reducing the size of the microparticles below a wavelength of a transmitted light flux, the scatter is sufficiently avoided from generation. A refractive index of a plastic material decreases when the temperature rises, and a refractive index of inorganic particles increases when the temperature rises. Therefore, the change in refractive index can be almost eliminated by using these temperature dependencies to make the dependencies work to cancel out from each other. Concretely, inorganic particles whose maximum size is 20 nanometers or less are dispersed into a plastic material as a base material, which results in a plastic material having an extremely low refractive index dependency on the temperature. For example, by dispersing microparticles of niobium oxide ($Nb_2O_5$) into acryl, a change in refractive index coming from a temperature change can be reduced. In the present invention, by using such the plastic material in which inorganic particles are dispersed for a positive lens with a relatively large refractive power (L1) or all the lenses (L1-L5), the fluctuation of the image point position of the total system of the image pickup lens caused when a temperature changes can be reduced.

In recent years, as a method of installing a large number of image pickup apparatuses at low cost, there has been proposed a technology to install electrical parts and optical elements at the same time, such that a reflow process (heating process) is performed under the condition that electrical parts including IC chips and optical elements are put on a substrate on which solder has previously been potted, to melt the solder.

In order to perform the reflow treatment, optical elements are required to be heated to about 200-260° C. together with electric parts. However, under such the high temperature, lenses formed of thermoplastic resin are deformed by heat or become discolored by heat and the optical properties are deteriorated, which is a problem. As one method to solve the problem, there has been a technique that molded glass lenses with excellent heat resistance are used to achieve both of downsizing and maintaining proper optical properties under a high-temperature environment. However, since the lenses require higher cost than lenses formed of thermoplastic resin, it is difficult to meet the demand of reducing the cost of the image pickup apparatus, which has been a problem.

Therefore, when energy curable resin is used for a material of an image pickup lens, deterioration of the optical properties caused when it is exposed under a high temperature is small in comparison with lenses formed of thermoplastic resin such as polycarbonate resins and polyolefin resins. The use of the energy curable resin is advantageous for the reflow process, makes the production of lenses easier than the molded glass lenses to achieve a low cost, and achieves both of a low cost and mass productivity of an image pickup apparatus in which an image pickup lens is installed. Herein, energy curable resin means any one of heat-curable resin and photo-curable resin.

Plastic lenses of the present invention may be formed by using the above energy curable resin.

In the present examples, an incident angle of the principal ray of a light flux entering the image pickup plane of a solid-state image pickup element is not designed to be usually small around the periphery of the image pickup plane. However, in the recent technology, it comes to be achieved that shading is reduced by reconsidering an arrangement of a color filter of a solid-state image pickup element and an arrangement of on-chip micro-lens array. Concretely, when a pitch of an arrangement of a color filter or on-chip micro-lens array is set to be slightly smaller than a pixel pitch of an image pickup plane of an image pickup element, the color filter or on-chip micro-lens array shifts more greatly toward the optical axis of the image pickup lens as the position goes closer to the periphery of the image pickup plane. Thereby, a light flux which enters there obliquely can be guided to light-receiving sections of respective pixels effectively, which can reduce shading generated on the solid-state image pickup element. The present examples provide design examples aiming at furthermore downsizing, because the above demand is reduced.

REFERENCE SIGNS LIST

| | |
|---|---|
| L | Image pickup lens |
| L1 | First lens |
| L2 | Second lens |
| L3 | Third lens |
| L4 | Fourth lens |
| L5 | Fifth lens |
| S | Aperture stop |
| F | Parallel flat plate |
| I | Image pickup plane |
| C | Solid-state image pickup element |

The invention claimed is:

1. An image pickup lens for forming an image of a subject onto a photoelectric conversion section of a solid-state image pickup element, the image pickup lens comprising, in order from an object side:

an aperture stop;
a first lens with positive refractive power, comprising a convex surface facing the object side;
a second lens with negative refractive power, comprising a concave surface facing an image side;
a third lens with positive refractive power, comprising a convex surface facing the image side;
a fourth lens with positive refractive power, having a meniscus shape comprising a convex surface facing the image side; and
a fifth lens with negative refractive power, comprising a concave surface facing the image side,
wherein the image pickup lens satisfies the following conditional expressions:

$$2.0 < (r7+r8)/(r7-r8) < 8.0,$$

$$0.8 < SL/f < 1.5,$$

wherein r7 is a curvature radius of a surface facing the object side of the fourth lens,
r8 is a curvature radius of the surface facing the image side of the fourth lens,
SL is a distance on an optical axis from the aperture stop to a focal point at the image side, and
f is a focal length of a total system of the image pickup lens.

2. The image pickup lens of claim 1, satisfying the following conditional expression:

$$0.6 < f4/f < 2.0,$$

where f4 is a focal length of the fourth lens.

3. The image pickup lens of claim 1 satisfying the following conditional expression:

$$0.5 < f3/f4 < 5.0,$$

where f3 is a focal length of the third lens, and
f4 is a focal length of the fourth lens.

4. The image pickup lens of claim 1, satisfying the following conditional expression:

$$20 < v1 - v2 < 70,$$

where v1 is an Abbe number of the first lens, and
v2 is an Abbe number of the second lens.

5. The image pickup lens of claim 1, satisfying the following conditional expression:

$$1.55 < n2 < 2.10,$$

where n2 is a refractive index of the second lens for d-line.

6. The image pickup lens of claim 1,
wherein a focal position is adjusted by moving the first through third lenses, and
the image pickup lens satisfies the following conditional expression:

$0.05 < d6/f < 0.15$, where d6 is an air distance on the optical axis between the third lens and the fourth lens.

7. The image pickup lens of claim 1,
wherein the surface facing the image side of the second lens has an aspheric shape wherein negative refractive power becomes weaker at a position farther from the optical axis.

8. The image pickup lens of claim 1,
wherein the aperture stop is located at a position closer to the image side than a position on an optical axis on the surface facing the object side of the first lens, and is arranged to be closer to the object side than a most peripheral portion of the surface facing the object side of the first lens.

9. The image pickup lens of claim 1,
wherein the surface facing the image side of the fifth lens is formed into an aspheric shape and has negative refractive power at a center, where the negative refractive power becomes weaker at a position closer to a periphery, and the surface facing the image side of the fifth lens includes an inflection point.

10. The image pickup lens of claim 1,
wherein each of the first to fifth lenses is formed of a plastic material.

11. An image pickup apparatus comprising:
a solid-state image pickup element for performing a photoelectric conversion for an image of a subject; and
the image pickup lens of claim 1.

12. A mobile terminal comprising the image pickup apparatus of claim 11.

* * * * *